US012485352B2

(12) United States Patent
Akitake et al.

(10) Patent No.: US 12,485,352 B2
(45) Date of Patent: Dec. 2, 2025

(54) PROGRAM, INFORMATION PROCESSING DEVICE, METHOD, AND SYSTEM

(71) Applicant: CYGAMES, INC., Tokyo (JP)

(72) Inventors: Satoshi Akitake, Tokyo (JP); Toshiyuki Hibi, Tokyo (JP); Kazutaka Arai, Tokyo (JP)

(73) Assignee: CYGAMES, INC., Tokyo (JP)

( * ) Notice: Subject to any disclaimer, the term of this patent is extended or adjusted under 35 U.S.C. 154(b) by 297 days.

(21) Appl. No.: 18/183,743

(22) Filed: Mar. 14, 2023

(65) Prior Publication Data

US 2023/0211237 A1 Jul. 6, 2023

Related U.S. Application Data

(63) Continuation of application No. PCT/JP2021/033006, filed on Sep. 8, 2021.

(30) Foreign Application Priority Data

Sep. 15, 2020 (JP) ................................ 2020-154666

(51) Int. Cl.
*A63F 13/798* (2014.01)
*A63F 13/537* (2014.01)

(52) U.S. Cl.
CPC .......... *A63F 13/798* (2014.09); *A63F 13/537* (2014.09)

(58) Field of Classification Search
CPC ..... A63F 13/828; A63F 13/798; A63F 13/537
See application file for complete search history.

(56) References Cited

U.S. PATENT DOCUMENTS 8,360,835 B2 * 1/2013 Strause .................. G06Q 50/34 463/7
9,522,332 B2 * 12/2016 Hansen ............... A63F 13/5375
(Continued)

FOREIGN PATENT DOCUMENTS

JP 2001340646 A 12/2001
JP 2006068132 A 3/2006
(Continued)

OTHER PUBLICATIONS

Mario Kart Tour "A little introduction to the contents of v2.1.0 released today!" Twitter, May 14, 2020 (2 pages).
(Continued)

*Primary Examiner* — Steve Rowland
(74) *Attorney, Agent, or Firm* — Osha Bergman Watanabe & Burton LLP

(57) ABSTRACT

An information processing device 10 is an information processing device for a game in which rankings of a plurality of game media are respectively determined and a winning team is determined among a plurality of teams consisting of the game media, the information processing device including: a game-media-to-be-used management unit 23*a* that manages, as the same teams, a plurality of game media selected by a player from a game media group including the plurality of game media; and a game execution unit 23*b* that executes the game by employing the plurality of game media managed as the teams, wherein the game execution unit 23*b* has a ranking determination unit 235 that respectively determines the rankings of the game media employed in the game and a winning-team determination unit 236 that determines the winning team on the basis of the rankings determined by the ranking determination unit 235.

10 Claims, 12 Drawing Sheets

(56) References Cited

U.S. PATENT DOCUMENTS

| | | | | | |
|---|---|---|---|---|---|
| 2004/0266535 | A1* | 12/2004 | Reeves | A63F 13/30 | 463/42 |
| 2007/0004516 | A1* | 1/2007 | Jordan | A63F 13/65 | 463/42 |
| 2007/0244878 | A1* | 10/2007 | Hulme | A63F 13/30 | 707/999.005 |
| 2008/0207326 | A1* | 8/2008 | Carlevato | A63F 13/795 | 463/40 |
| 2009/0075710 | A1 | 3/2009 | Toyoda et al. | | |
| 2009/0227302 | A1 | 9/2009 | Abe | | |
| 2012/0178510 | A1* | 7/2012 | DeVore | A63F 13/828 | 463/2 |
| 2012/0202599 | A1* | 8/2012 | Cohen | A63F 13/798 | 463/43 |
| 2014/0274332 | A1* | 9/2014 | Carlin | G07F 17/3244 | 463/25 |
| 2015/0080124 | A1* | 3/2015 | Andersen | G07F 17/3288 | 463/31 |
| 2015/0179021 | A1* | 6/2015 | Alexander | G07F 17/3272 | 463/22 |
| 2016/0210815 | A1* | 7/2016 | Holt | G07F 17/329 | |
| 2017/0128840 | A1* | 5/2017 | Croci | A63F 13/335 | |
| 2017/0357391 | A1* | 12/2017 | Galfond | G07F 17/3288 | |
| 2021/0138344 | A1 | 5/2021 | Narita et al. | | |
| 2023/0211237 | A1* | 7/2023 | Akitake | A63F 13/798 | 463/42 |

FOREIGN PATENT DOCUMENTS

| | | | |
|---|---|---|---|
| JP | 2009045353 | A | 3/2009 |
| JP | 2009213827 | A | 9/2009 |
| JP | 2014155554 | A | 8/2014 |
| JP | 2016135174 | A | 7/2016 |
| JP | 2019-118691 | A | 7/2019 |
| JP | 2020-014736 | A | 1/2020 |

OTHER PUBLICATIONS

Marsushihasu "My time: Mario Kart Tour and Daily Story" May 17, 2020 (8 pages).

Toshitsu "#78, Shooting in battle! subject animation" Youtube; Aug. 28, 2020 (20 pages).

Mario Kart Tour "Item List" AppMedia TopMario Kart Walk-through Wiki; May 24, 2019 (8 pages).

"New mode team battle in new mode, who can be anyone who can be who can be anyone who can be held by a w-multipoly who is not clear" Youtube; May 27, 2020 (16 pages).

Mario Kart Tour "The Benefits of Raising Your Driver Rank, How to Raise Your Rank Efficiently" Gamepedia; Sep. 28, 2019 (7 pages).

"Team Sonic Racing play report. Sonic who drives the race machine aims for victory as a team" 4gamer; May 23, 2019 (23 pages).

"Team sonic racing, A new world of racing games opens up in team battles!" Electric Shock Nintendo, vol. 19, No. 4; Jun. 21, 2019 (6 pages).

"Anyway, the team battle is fresh! Team Sonic Racing preview" IGN; Jun. 21, 2018 (9 pages).

"Team Sonic Racing The item "Wisp" that determines the victory or defeat of the race and the new course "Sky Road" Information released" Famitsu; Apr. 18, 2019 (16 pages).

"R2BEAT Latino Wiki: Frequently Asked Questions" May 18, 2013 (7 pages).

"R2BEAT-ItemWiki: Item List" Aug. 27, 2007 (5 pages).

Explosion Rescission, "Item matching Strategies and Lists of Items" GameWith; Dec. 13, 2019 (8 pages).

Hasota "PS4 Team Sonic Racing" Game Girl; May 21, 2019 (9 pages).

"Mario Sport Mix" Youtube; Dec. 26, 2010 (10 pages).

Office Action issued in Japanese Application No. 2020-154666; Dated Sep. 13, 2021 (11 pages).

Office Action issued in Japanese Application No. 2020-154666; Dated Jan. 24, 2022 (8 pages).

International Search Report issued in International Application No. PCT/JP2021/033006, mailed Oct. 26, 2021 (8 pages).

Written Opinion issued in International Application No. PCT/JP2021/033006; Dated Oct. 26, 2021 (5 pages).

Office Action issued in the counterpart Japanese Application No. 2022-076729, mailed Sep. 28, 2023 (12 pages).

KartRider Racing: This magnet is very clever; URL: https://www.bilibili.com/video/BV1Tx411i775/?spm_id_from=333.337.searchcard.all.click&vd_source=746f85fb79b0bc9c9a2aa91074b72dfe ; Jul. 20, 2017 (2 pages).

* cited by examiner

PROGRAM, INFORMATION PROCESSING DEVICE, METHOD, AND SYSTEM

TECHNICAL FIELD

The present invention relates to a program and so forth, and relates, in particular, to a program and so forth that executes a game employing a game medium selected by a player.

BACKGROUND ART

In recent years, electronic devices, such as smartphones, have rapidly spread, and numerous games executed on the electronic devices have also been released. Among this type of games, there is a known racing game in which a plurality of game media, such as racehorses, participate in a race to compete with each other for rankings (for example, see Patent Literature 1).

CITATION LIST

Patent Literature

{PTL 1}

Japanese Unexamined Patent Application, Publication No. 2009-045353

SUMMARY OF INVENTION

Technical Problem

With a game in which a plurality of game media compete with each other to determine the rankings, all game media other than the game medium that a player sets to participate in a race are player's rivals and the objective is to make the player's game medium win; therefore, game strategies tend to be simplified, and there has been a demand for a game in which game strategies are developed involving a plurality of aspects encompassing other elements. Such a problem is not limited to racing games and is shared among games in which rankings are determined.

The present invention has been conceived in order to solve such a problem, and an object thereof is to provide a program, an information processing device, a method, and a system that are capable of enhancing the attractiveness of a game.

Solution to Problem

An aspect of the present invention is a program for a game in which rankings of a plurality of game media are respectively determined and a winning team is determined among a plurality of teams consisting of the game media, the program characterized by causing a computer to function as: a game-media-to-be-used managing means for managing, as the same teams, a plurality of game media selected by a player from a game media group including the plurality of game media; and a game executing means for executing the game by employing the plurality of game media managed as the teams, wherein the game executing means has a ranking determining means for respectively determining the rankings of the game media employed in the game, and a winning-team determining means for determining the winning team on the basis of the rankings determined by the ranking determining means.

Another aspect of the present invention is an information processing device for a game in which rankings of a plurality of game media are respectively determined and a winning team is determined among a plurality of teams consisting of the game media, the information processing device being characterized by including: a game-media-to-be-used managing means for managing, as the same teams, a plurality of game media selected by a player from a game media group including the plurality of game media; and a game executing means for executing the game by employing the plurality of game media managed as the teams, wherein the game executing means has a ranking determining means for respectively determining the rankings of the game media employed in the game, and a winning-team determining means for determining the winning team on the basis of the rankings determined by the ranking determining means.

Another aspect of the present invention is a method for an information processing device to execute a game in which rankings of a plurality of game media are respectively determined and a winning team is determined among a plurality of teams consisting of the game media, the method being characterized by including: a game-media-to-be-used management step of managing, as the same teams, a plurality of game media selected by a player from a game media group including the plurality of game media; and a game executing step of executing the game by employing the plurality of game media managed as the teams, wherein the game executing step has a ranking determining step of respectively determining the rankings of the game media employed in the game, and a winning-team determining step of determining the winning team on the basis of the rankings determined by the ranking determining means.

Another aspect of the present invention is a system for a game in which rankings of a plurality of game media are respectively determined and a winning team is determined among a plurality of teams consisting of the game media, the system being characterized by including: a game-media-to-be-used managing means for managing, as the same teams, a plurality of game media selected by a player from a game media group including the plurality of game media; and a game executing means for executing the game by employing the plurality of game media managed as the teams, wherein the game executing means has a ranking determining means for respectively determining the rankings of the game media employed in the game, and a winning-team determining means for determining the winning team on the basis of the rankings determined by the ranking determining means.

Advantageous Effects of Invention

The present invention affords an advantage in that it is possible to enhance the attractiveness of a game.

DESCRIPTION OF EMBODIMENTS

A game system according to an embodiment of the present invention will be described with reference to the drawings. In this description, there will be cases in which unnecessary details are omitted for the sake of the convenience of explanation. For example, there will be cases in which detailed descriptions of matters that are already well known or redundant descriptions of configurations that are essentially identical are omitted.

Although it is possible to realize this game system by means of a system in which a plurality of information processing devices are connected via a network, it is also possible to realize the game system by means of a single information processing device. First, a case in which the game system is realized by means of a single information processing device will be described, and a system connected to a network will be described next.

[Embodiments Realized by Information Processing Device]

[Configuration]

Figure 1:
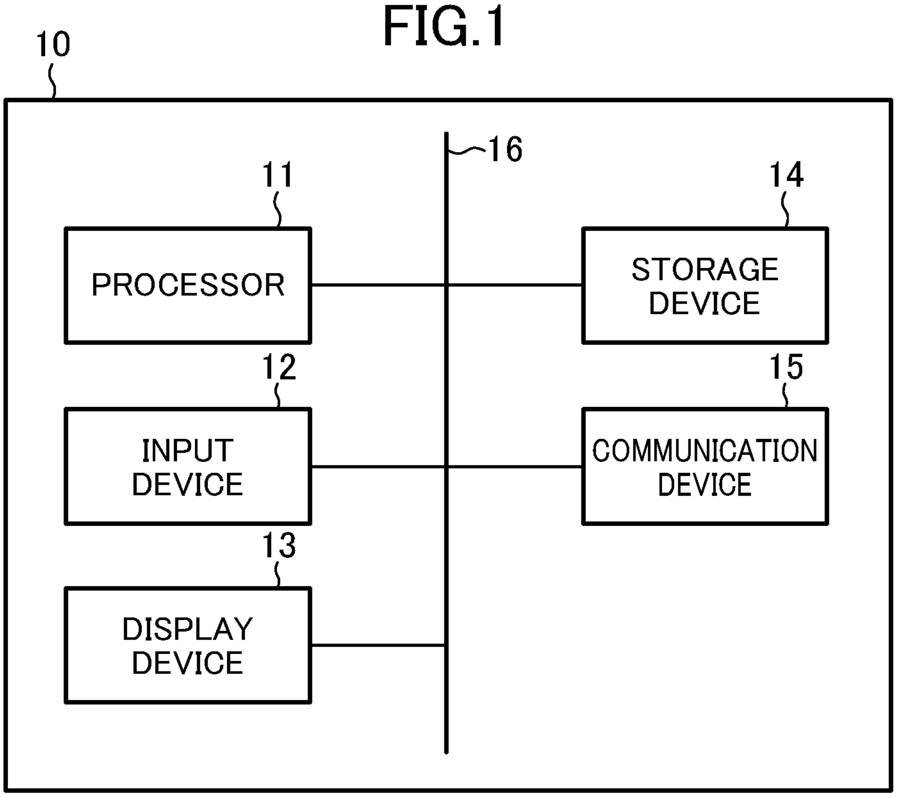
FIG. 1 is a block diagram showing a hardware configuration of an information processing device according to an embodiment of the present invention.

FIG. 1 is a block diagram showing a hardware configuration of an information processing device 10 according to an embodiment of the present invention. The information processing device 10 includes a processor 11, an input device 12, a display device 13, a storage device 14, and a communication device 15. The respective components 11-15 are connected by a bus 16. Note that interfaces may be interposed between the bus 16 and the respective components 11-15, as needed. In this embodiment, the information processing device 10 is a smartphone. However, so long as the above-described components are included, the information processing device 10 could be a computer, such as a tablet computer, a laptop computer, or a desktop computer.

The processor 11 controls the operation of the information processing device 10 as a whole, and is, for example, an electronic circuit, such as a CPU or an MPU. The processor 11 executes various types of processing by loading and executing programs and data stored in the storage device 14. In one example, the processor 11 consists of a plurality of processors.

The input device 12 is a user interface that receives, from a user, inputs to the information processing device 10 and is, for example, a touch screen, a touch pad, a keyboard, or a mouse. Because the information processing device 10 of this embodiment is a smartphone, the information processing device 10 includes a touch screen, and this touch screen serves as the input device 12 as well as the display device 13. The input device 12 and the display device 13 may take forms of separate components disposed at separate positions.

The display device 13 displays, in accordance with the control performed by the processor 11, an application screen or the like to a user of the information processing device 10, in other words, a player. As the display device 13, a liquid crystal display, an organic EL display, a plasma display, or the like can be employed.

The storage device 14 includes a main memory, a buffer memory, and a storage and is a storage device, a magnetic storage device, or the like employing a RAM, which is a volatile memory, and a flash memory, such as an eMMC, a UFS, or an SSD, which is a non-volatile memory, included in a general smartphone or computer. The storage device 14 can include an external memory. The storage device 14 stores, for example, a game application. The game application contains a game program for executing a game and various types of data referred to when executing the game program. The game program is started in response to the operation performed by the user on the information processing device 10, and is executed on the operating system (OS) installed in the information processing device 10 in advance.

In one example, the storage device 14 includes a main storage device and an auxiliary storage device. The main storage device is a volatile storage medium capable of high-speed reading/writing of information and is employed as a storage area and a work area when the processor 11 processes information. The auxiliary storage device stores various programs and data used by the programs when executing the respective programs. The auxiliary storage device is, for example, an SSD or a hard disk device; however, so long as the device is capable of storing the information, any non-volatile storage or non-volatile memory may be employed, and the device may be attachable/detachable. The auxiliary storage device stores, for example, the operating system (OS), a middleware, application programs, and various types of data that could be referred to when executing these programs.

The communication device 15 transmits/receives data to/from another computer, such as a server, via a network. For example, the communication device 15 connects to a network by means of wireless communication, such as mobile communication or a wireless LAN. In one example, the information processing device 10 downloads a program from the server by means of the communication device 15 and stores the program in the storage device 14. However, the communication device 15 may perform wired communication employing an Ethernet (registered trademark) cable or the like. In the case in which data are not transmitted to/received from the other computer, the communication device 15 may be omitted from the information processing device 10.

Figure 2:
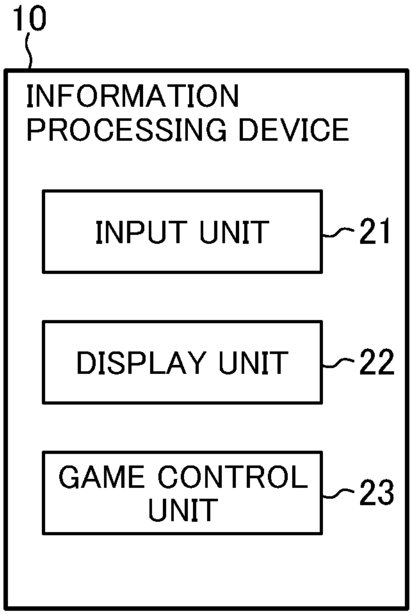
FIG. 2 is an example of a functional block diagram of the information processing device according to the embodiment of the present invention.

FIG. 2 is an example of a functional block diagram of the information processing device 10 according to an embodiment of the present invention. The information processing device 10 includes an input unit 21, a display unit 22, and a game control unit 23. In this embodiment, the processor 11 executes programs to realize functions thereof. For example, a program to be executed is a game program stored in the storage device 14 or received via the communication device 15. Because various functions are realized by loading programs in this way, a portion of one part (function) or the entirety thereof may be held by another part. The various functions are realized in the forms of individual means as a result of program executions. Electronic circuits or the like may be formed to realize a portion of or the entirety of the respective functions, and thus, the respective functions may also be realized by means of hardware.

The input unit 21 is configured by employing the input device 12 and receives, from the user, inputs to the information processing device 10. In this embodiment, a touch detection function of a touch screen, generally provided in a smartphone, can be employed.

The display unit 22 is configured by employing the display device 13 and displays, on the display device 13, a game screen in accordance with the game progress and the user manipulation. The game control unit 23 performs the basic control when executing a game of this embodiment. The game of this embodiment is a racing game in which, as in a horse racing game, characters, which are a plurality of game media, run a prescribed distance on prescribed courses to compete for arrival orders and the rankings are respectively determined for the plurality of game media, and is a game in which win-loss is determined among a plurality of teams consisting of the game media. In other words, this game is a game in which the arrival orders of all game media are determined and the win-loss of the teams is determined on the basis of the rankings. In this embodiment, a team to which a game medium arriving in the first place in a race belongs is designated as the winning team, and the rest of the teams are designated as losing teams. The game media are electronic data employed in the game, such as characters and equipment items such as weapons, items, and cards. The game media of this embodiment are characters. The game media of this embodiment are characters and are associated with IDs that uniquely identify the characters and images, objects and characteristic information that indicate the characters, displayed on the display device 13. The characteristic information is information items that indicate the characteristics of the game media and that are related to, for example, parameters and skills indicating abilities of the characters.

Figure 3:
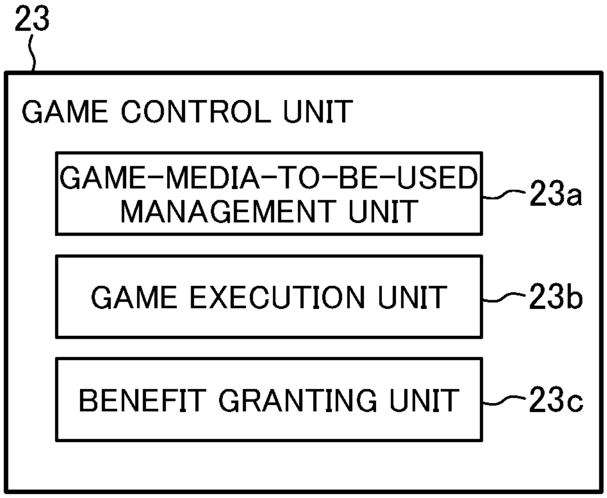
FIG. 3 is an example of a functional block diagram of a game control unit.

FIG. 3 is an example functional block diagram of the game control unit. As shown in FIG. 3, the game control unit 23 has a game-media-to-be-used management unit 23*a*, a game execution unit 23*b*, and a benefit granting unit 23*c*.

The game-media-to-be-used management unit 23*a* is configured by including the processor 11, the input device 12, and the storage device 14 and manages a plurality of game media selected by a player from a game media group as the same team. The game media group is a group of game media and is configured by containing the plurality of game media. The respective game media of the game media group are, for example, game media that the player owns and provide options for the player to select game media to be employed in the racing game. In this embodiment, the game media are stored in the storage device 14 in advance; however, the game media may be those acquired from other players via the communication device 15 or may be those the player himself/herself trained in a training game in which game media that could be employed in the game are trained.

The game-media-to-be-used management unit 23*a* receives, via the input device 12, the selection, made by the player, of the game media constituting the same team and manages the game media constituting the team by means of common or related identifiers. In one example, upon receiving, via the input device 12, the selection, made by the player, of the game media constituting the same team, the game-media-to-be-used management unit 23*a* assigns a common identifier to the game media constituting the team and stores the team, the identifier, and the game media in the storage device 14, such as a memory, in association with each other. In another example, in the case in which a player identifier that identifies the player is assigned to the respective game media constituting the game media group in advance, the game-media-to-be-used management unit 23*a* receives, via the input device 12, the selection, made by the player, of the game media constituting the team and stores the selected game media in the storage device 14, such as a memory, in association with the player identifier. Accordingly, because common or related identifiers are assigned to the game media of the same team, the game-media-to-be-used management unit 23*a* can specify the team of the respective game media by using the identifiers. In this way, the player can form a team to be employed in the game from the game media group by means of the game-media-to-be-used management unit 23*a*.

Figure 4:
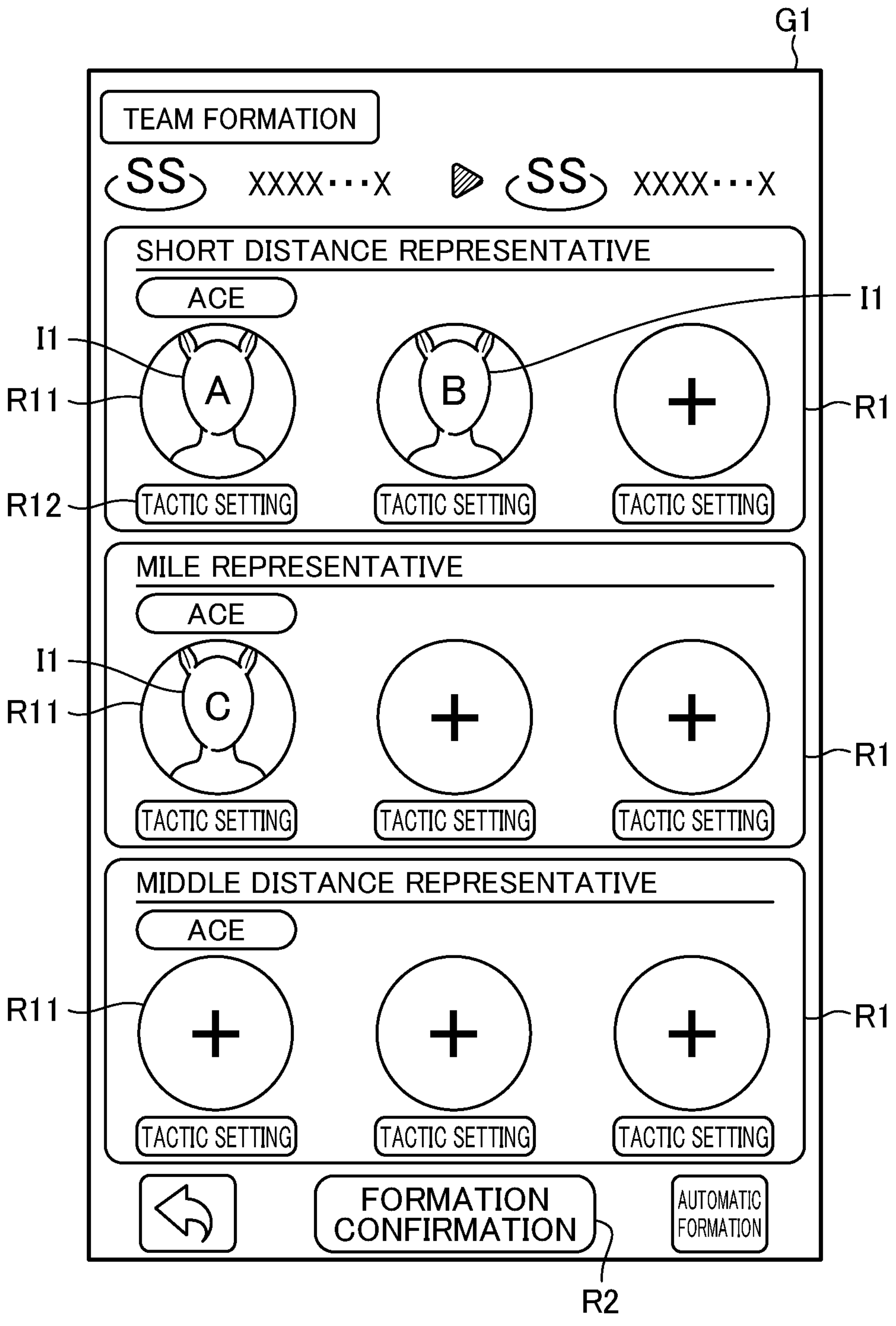
FIG. 4 is an example of a team formation screen for configuring a team.

FIG. 4 is an example of a team formation screen G1 on which the team is configured. As shown in FIG. 4, the game-media-to-be-used management unit 23*a* causes the display device 13 to display the team formation screen G1 and receives, via the input device 12, the selection of the game media employed by the player in the game. The team formation screen G1 contains team formation areas R1 and a formation confirmation button R2.

In the example in FIG. 4, display in each of the team formation areas R1 includes game-media-to-be-used setting area R11. The game-media-to-be-used setting area R11 is an area for setting game media (hereinafter, also referred to as the "game media to be used") that constitutes the same team and that are employed in the game. In this embodiment, a plurality of (in this case, three) game-media-to-be-used setting areas R11 are contained in each of the team formation areas R1 and one team can be formed with three game media. One of the game-media-to-be-used setting areas R11 may be designated as the game-media-to-be-used setting area R11 for setting a game medium to be used that serves as an ace. In the game of this embodiment, a plurality of (in this case, five) races are assumed to be one set, for each race, one team is formed with the plurality of (in this case, three) game media, and the teams participate in the races. In this embodiment, one team is formed for each of five types of races, namely, short distance, mile, middle distance, long distance, and dirt, and the teams participate in the corresponding races. Although the example in FIG. 4 shows three team formation areas R1 for short distance, mile, and middle distance, the remaining two team formation areas R1 for long distance and dirt can be displayed by means of scrolling or the like. In the example in FIG. 4, the team formation screen G1 does not display all of the team formation areas R1; however, all of the team formation areas R1 may be displayed in a list.

In each game-media-to-be-used setting area R11, an image I1 of the game medium selected as the game medium to be used or displays indicating that game media to be used have not been set ("+" in the example in FIG. 4) are displayed. As a result of a game-media-to-be-used setting area R11 being pressed, the game-media-to-be-used management unit 23*a* causes the display device 13 to display a game-medium-to-be-used selection screen G2 for selecting the game media to be used, as described later.

The formation confirmation button R2 is a button for confirming that the teams are configured by employing the selected game media to be used. The game-media-to-be-used management unit 23*a* receives a signal indicating that the input device 12 has detected pressing of the formation confirmation button R2 and configures the teams by employing the game media selected in the game-media-to-be-used setting areas R11 at that time.

A tactic setting button R12 may be displayed in each of the game-media-to-be-used setting areas R11 in each of the team formation areas R1. The tactic setting button R12 is a button for setting a tactic to be given to the corresponding game medium and causes the screen to transition so as to allow one of front runner, stalker, midfield, and closer to be set. The tactics can be set in accordance with the characteristics of the respective game media to be used, roles thereof in the team, and game strategies.

Figure 5:
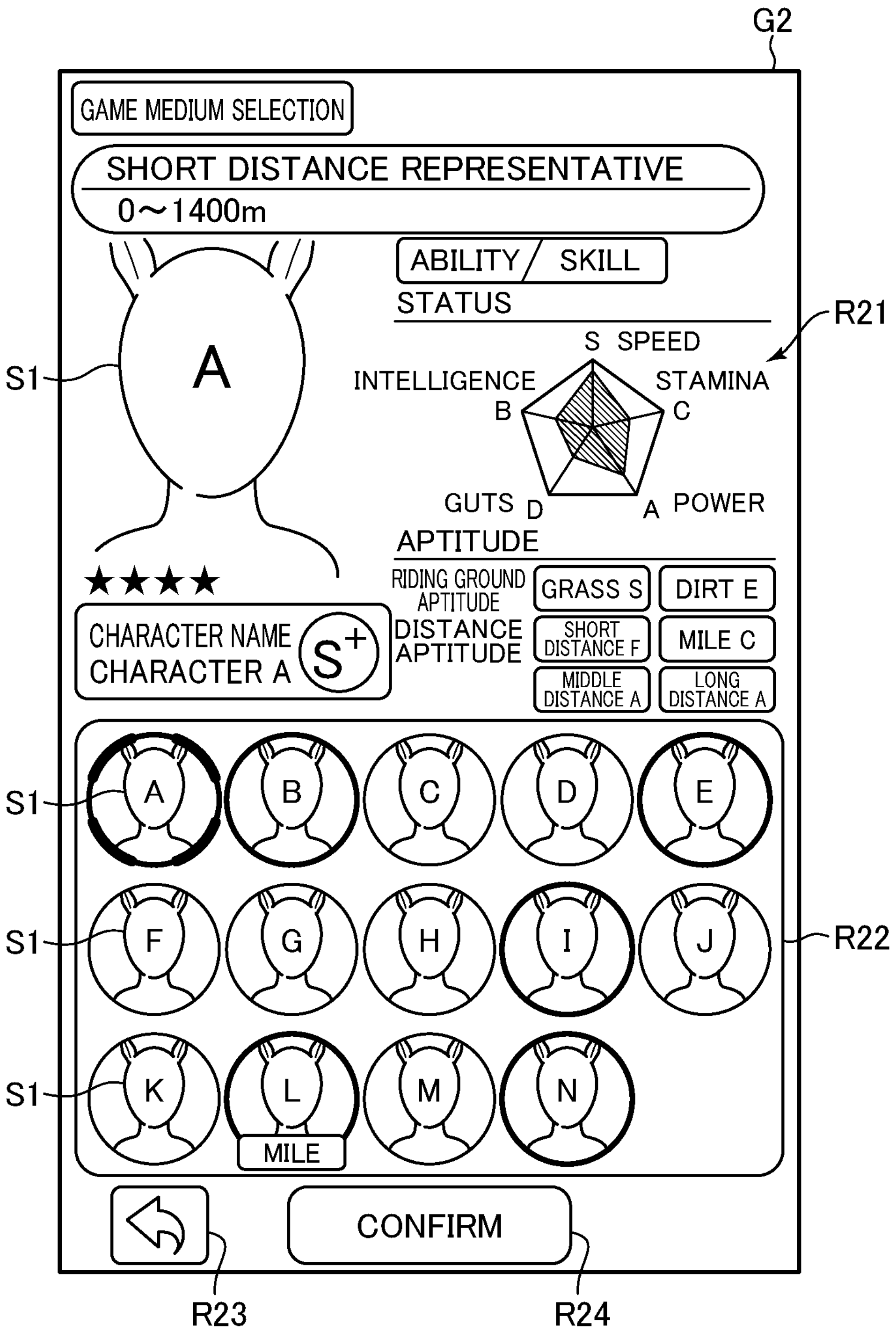
FIG. 5 is an example of a game-media-to-be-used selection screen.

FIG. 5 is an example of a game-medium-to-be-used selection screen G2. As shown in FIG. 5, when one of the game-media-to-be-used setting areas R11 is pressed, the game-media-to-be-used management unit 23*a* causes the display device 13 to display the game-medium-to-be-used selection screen G2 and receives, via the input device 12, the selection of the game media made by the player. The game-medium-to-be-used selection screen G2 contains a selected game-medium-to-be-used display area R21, a game-media-group display area R22, a back button R23, and a confirm button R24.

In the game-media-group display area R22, images S1 of a plurality of game media (in this case, characters A-N) the player owns are displayed. The plurality of game media are the game media that constitute the game media group. In this embodiment, because the touch screen of the information processing device 10 constitutes the display device 13 and the input device 12, it is possible to receive the selection of one of game media displayed in the game-media-group display area R22 by means of a finger or the like of the player.

The display in the selected game-medium-to-be-used display area R21 includes the image of the game medium selected from the plurality of game media and the characteristic information thereof. The characteristic information includes, for example, basic ability parameters, which indicate the speed, the stamina, the power, the guts, and the intelligence, aptitude parameters, which include the riding ground aptitude and the distance aptitude, skill, and so forth. The riding ground aptitudes include, for example, the grass aptitude, and the dirt aptitude, and the distance aptitudes include, for example, the short distance aptitude, the mile aptitude, the middle distance aptitude, and the long distance aptitude. Each parameter is, for example, a numerical value, and, in one example, a rank or a level may be displayed by means of an alphabetical display or the like in accordance with the rank or the level along with the numerical value or instead of the numerical value. For example, rank S indicates the highest aptitude and the aptitude decreases, in order of ranks S, A, B, C, and so forth, with increasing steps away from rank S. In one example, the case in which the speed parameter is displayed as rank S indicates a characteristic of the speed being high and the case in which the speed parameter is displayed as rank F indicates a characteristic of the speed being low.

As shown in FIG. 5, with an "ability" tab in the selected game-medium-to-be-used display area R21, the basic ability parameters and the aptitude parameters are displayed, and with the "skill" tab, information related to skills associated with the selected game medium are displayed.

The skills are techniques of the game media that are associated with the respective game media and that are activated during the game. The skills, when activated, change the parameters of the basic ability parameters or the like associated with the player's game media or other game media. The skills can include skills that impart disadvantageous effects (hereinafter, also referred to as "debuff skills") and skills that impart advantageous effects (hereinafter, also referred to as "buff skills"). In one example, a debuff skill is a skill that decreases a parameter associated with the game medium to which the debuff skill effect is imparted. In one example, a buff skill is a skill that increases a parameter associated with the game medium to which the buff skill effect is imparted. For the respective skills, skill activation conditions, which define conditions for activating said skills such as when and where, skill imparting target conditions, which define to which game media the skill effects will be imparted, and skill effects, which define the specifics of the skill effects, are defined. The information related to the skills can include the skill effects, the skill activation conditions, and the skill imparting target conditions. In one example, the skill effects, the skill activation conditions, and the skill imparting target conditions are respectively stored in the storage device 14 as separate data, and said data can be associated with each other by assigning, to the respective data, common skill IDs for the respective skills.

The back button R23 is a button for returning to the team formation screen G1 and the confirm button R24 is a button for confirming that the game medium selected in the game-media-group display area R22 is a member of the team. As a result of the back button R23 being pressed, the game-media-to-be-used management unit 23*a* causes the display to transition to the team formation screen G1 without setting the game medium selected in the game-media-group display area R22 to be a member of the team. As a result of the confirm button R24 being pressed, the game-media-to-be-used management unit 23*a* sets the game medium selected in the game-media-group display area R22 to be a member of the team and causes the display to transition to the team formation screen G1.

Figure 6:
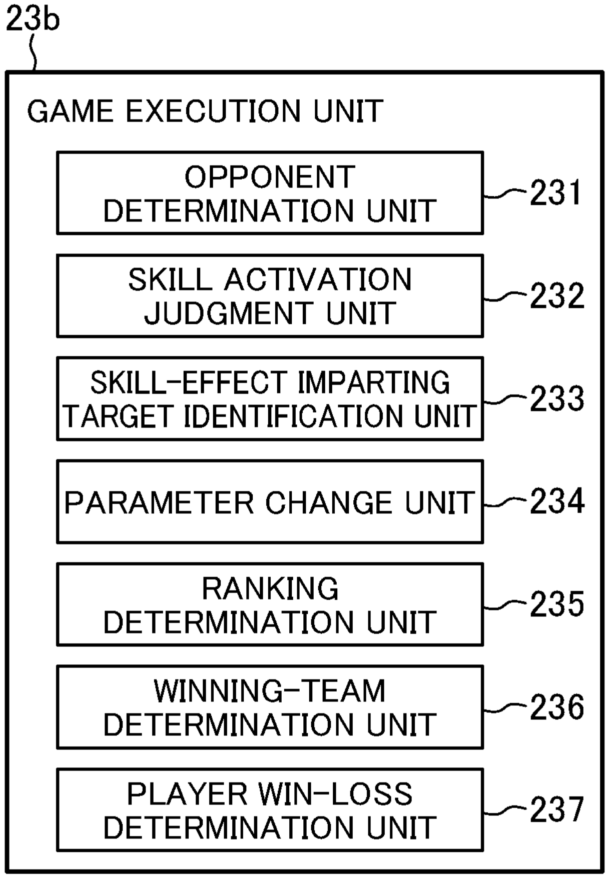
FIG. 6 is an example of a functional block diagram of a game execution unit.

The game execution unit 23*b* is configured by including the processor 11 and executes the game by employing the plurality of game media managed as the teams. FIG. 6 is an example functional block diagram of the game execution unit. The game execution unit 23*b* has an opponent determination unit 231, a skill activation judgment unit 232, a skill-effect imparting target identification unit 233, a parameter change unit 234, a ranking determination unit 235, a winning-team determination unit 236, and a player win-loss determination unit 237.

The opponent determination unit 231 is configured by including the processor 11 and determines the opponent of the player. In one example, the opponent determination unit 231 causes the display device 13 to display a plurality of opponents and to display an opponent selection screen (not shown) for prompting the player to select an opponent, receives, by means of the input device 12, the selection of one opponent made by the player, and determines said selected contender as the opponent. In one example, the opponent is a contender who assumes a plurality of (in this case, five) races to be one set, forms, for each race, one team with a plurality of (in this case, three) game media, and employs the teams to participate in the races. On the opponent selection screen, a rank or a level indicating the strength that influences the win-loss may be displayed for each opponent so as to serve as reference for the player. In another example, the opponent determination unit 231 randomly determines the opponent from the plurality of opponents. As a result of the opponent determination unit 231 determining the opponent, the game execution unit 23*b* can start the races. In the case in which the number of game media employed by the player and the opponent falls short of the number of game media participating in the respective races, the game execution unit 23*b* sets game media that participates in said races. Specifically, the number of game media that the game execution unit 23*b* sets for one race is calculated as [the number N of game media participating in one race]−[(the number of player's teams)×{the number of game media constituting a team)]−[(the number of opponents)×(the number of opponents' teams)×(the number of game media constituting a team)]. In one example, in the case in which three game media that form one team, the team being formed for each of one player and one opponent, participate in a race in which N (for example, 18) game media participate, the number of game media falls short by (N−6 (for example, 12)); therefore, the game execution unit 23*b* sets 12 game media by executing the game program. This setting may be performed randomly or may be performed in accordance with the level or the rank indicating the strength of the player or the opponent. Note that, hereinafter, the game media set by the game execution unit 23*b* by means of the game program will also be referred to as the automatically set game media. The game execution unit 23*b* automatically renders the race by executing the game program on the basis of prescribed conditions including the characteristic information that includes the basic ability parameters, the aptitude parameters, and the skills of the respective game media participating in the race. The automatic rendering of the race can include arbitrary behaviors of the game media, such as movements of the game media (characters) and activations of the skills of said game media. In other words, player manipulations are ineffective during a race. The player manipulations are made ineffective during a race in this way, because, in this embodiment, one player uses the plurality of game media in one race and it is difficult for the player to simultaneously manipulate said plurality of game media. However, in another example, the game execution unit 23*b* may render a race by executing the game program after receiving player's manipulation for one game media among the plurality of game media that the one player uses in the race. For example, the game execution unit 23*b* may move said one game medium in accordance with the player's manipulation input or may activate the skills in accordance with the player's manipulation input, even though the movement of the one game medium is kept automatic.

The skill activation judgment unit 232 is configured by including the processor 11 and makes a judgement as to whether the skill activation conditions for activating the skills associated with the game media are met during the game. The skill activation conditions are conditions for activating the skills, and, for example, define the specifics such as when and where the skill effects will be imparted. "When" refers to, for example, a point in time at which a prescribed amount of time has passed from the start of the game, the early part of the game, the middle part of the game, or the end part of the game, and "where" refers to, for example, the $i^{th}$ corner (i is a natural number).

The skill-effect imparting target identification unit 233 is configured by including the processor 11 and identifies the game media to which the skill effects will be imparted on the basis of the identifiers associated with the game media to which the skill effects will be imparted (hereinafter, also referred to as the "skill-effect imparted game media") and the identifiers associated with the game media that activate said skills (hereinafter, also referred to as the "skill-activating game media"). Specifically, first, the skill-effect imparting target identification unit 233 specifies the skill-effect imparted game media on the basis of the skill imparting target conditions having the same skill IDs as the skill activation conditions that the skill activation judgment unit 232 has judged as being met. Next, the skill-effect imparting target identification unit 233 compares the identifiers of the specified skill-effect imparted game media and the identifiers associated with the skill-activating game media and specifies the skill-effect imparted game media. The skill imparting target conditions define the targets (whom) to which the skill effects will be imparted. In one example, the targets (whom) to which the skill effects will be imparted are other game media that are present in a prescribed area defined on the basis of the position of a game medium that activates a skill in the game, and, in another example, a target is a game medium that is at a prescribed ranking during the game. For example, the targets to which skill effects will be imparted can be defined as other game media that are present in a prescribed area centered on the game medium that activates a skill and that are positioned forward, rearward, and on the sides, a game medium that is present in said prescribed area and whose provisional ranking is the first place, etc.

In one example, the skill-effect imparting target identification unit 233 determines, among the skill-effect imparted game media specified in the case in which the skill activation judgment unit 232 has judged that the skill activation conditions are met, only the game media in which the identifiers are different from the identifiers of the skill-activating game media to be the game media to which the skill effects will be imparted. For example, in the case in which the skill is a debuff skill that imparts a disadvantageous effect to three game media in a prescribed area (for example, forward) with respect to the skill-activating game medium, the skill-effect imparting target identification unit 233 compares the identifiers associated with three game media in the specified prescribed area (for example, forward) and the identifier associated with the skill-activating game medium. As a result of the comparison, the skill-effect imparting target identification unit 233 sets only the game media in which the identifiers are different from the identifier of the skill-activating game medium to be the skill-effect imparted game media to which said debuff skill effect will be imparted and does not set the rest of the game media to be the skill-effect imparted game media to which the debuff skill effect will be imparted. In other words, the skill-effect imparting target identification unit 233 performs the identification so that the debuff skill effect is not imparted to, among the specified skill-effect imparted game media, the game media belonging to the same team (in other words, the player's team) as the skill-activating game medium and the debuff skill effect is imparted to the game media belonging to a different team (in other words, the opponent's team) from the skill-activating game medium.

In another example, the skill-effect imparting target identification unit 233 determines, among the skill-effect imparted game media specified in the case in which the skill activation judgment unit 232 has judged that the skill activation conditions are met, only the game media in which the identifiers are the same as the identifiers of the skill-activating game media to be the game media to which the skill effects will be imparted. For example, in the case in which the skill is a buff skill that imparts an advantageous effect to three game media in a prescribed area (for example, forward) with respect to the skill-activating game medium, the skill-effect imparting target identification unit 233 compares the identifiers associated with three game media in the specified prescribed area (for example, forward) and the identifier associated with the skill-activating game medium. As a result of the comparison, the skill-effect imparting target identification unit 233 sets only the game media in which the identifiers are the same as the identifier of the skill-activating game medium to be the skill-effect imparted game media to which said buff skill effect will be imparted and does not set the rest of the game media to be the skill-effect imparted game media to which the buff skill effect will be imparted. In other words, the skill-effect imparting target identification unit 233 performs the identification so that the buff skill effect is not imparted to, among the specified skill-effect imparted game media, the game media belonging to the different team (in other words, the opponent's team) from the skill-activating game medium and the buff skill effect is imparted to the game media belonging to the same team (in other words, the player's team) as the skill-activating game medium.

The parameter change unit 234 is configured by including the processor 11 and changes parameters associated with the identified game media. Specifically, the parameter change unit 234 changes, on the basis of the skill effect of the skill-activating game medium, parameters of the game media identified by the skill-effect imparting target identification unit 233. For example, in the case in which the skill effect specifies to decrease the speed by 5, the parameter change unit 234 decreases the parameters indicating the speed of the skill-effect imparted game media by 5, and, in the case in which the skill effect specifies to increase the stamina by 10, the parameter change unit 234 increases the parameters indicating the stamina of the skill-effect imparted game media by 10.

Figure 7:
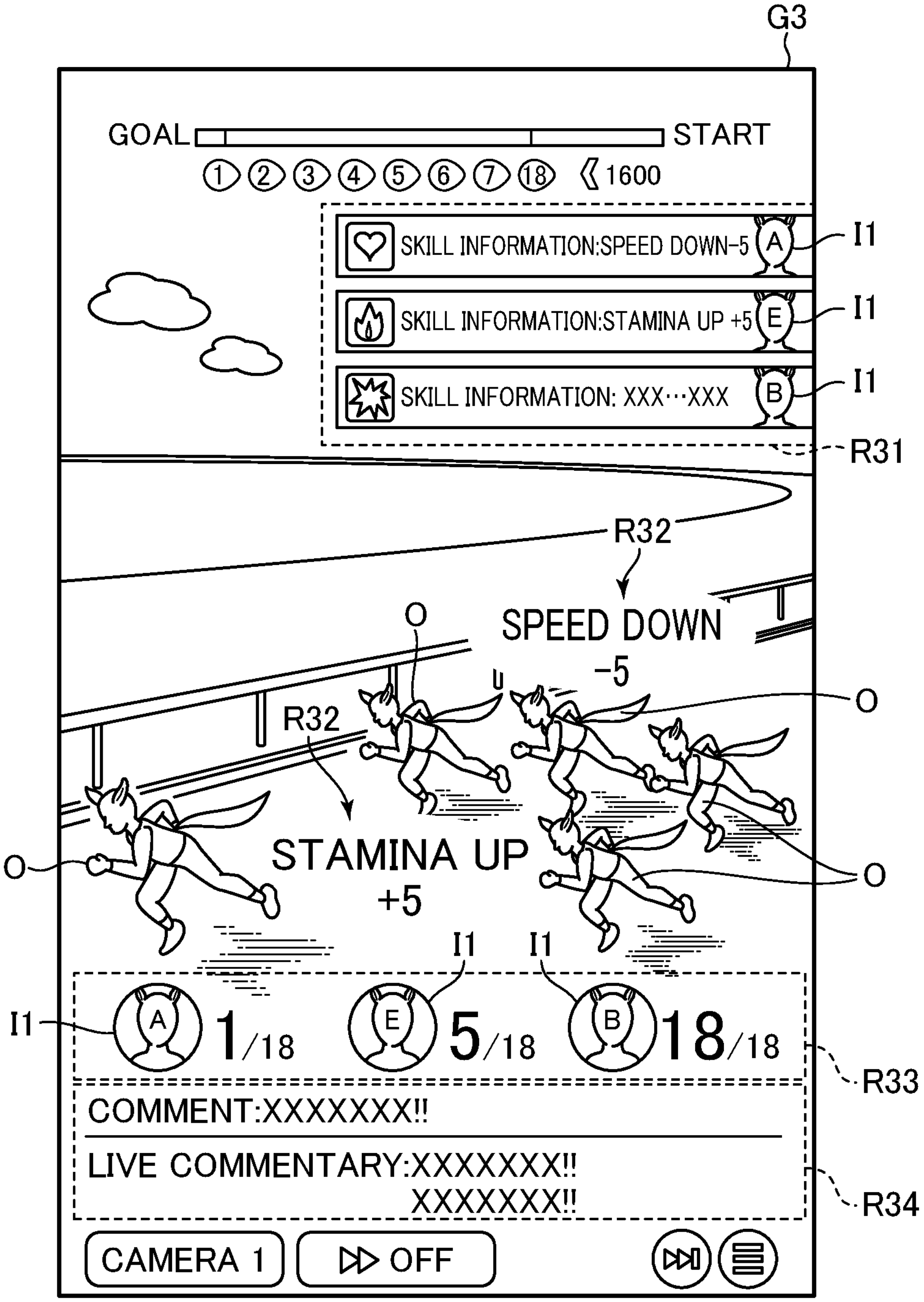
FIG. 7 is an example of a race screen.

The game execution unit 23*b* causes the display device 13 to display a screen showing a state of the race during the game. FIG. 7 is an example of a race screen G3. The display on the race screen G3 includes a state in which the plurality of game media compete on racetracks, a skill display area R31, a skill effect display R32, a ranking display area R33, and a situation describing area R34.

The skill display area R31 displays skills that are activated during a race for the respective game media of the player's team. In one example, the skill display area R31 displays the images I1 of the respective game media of the player's team and information related to the skills of the respective game media. The information related to the skills can include the names of the skills and/or the specifics of the skills. The displays of the respective skills in the skill display area R31 may be displayed when the skills are activated.

As shown in FIG. 7, the race screen G3 displays objects O of the respective game media on the racetracks. As shown in FIG. 7, the game execution unit 23*b* causes the skill effect displays R32 to be displayed in association with the skill activations. The skill effect displays R32 are displays showing the skill effects. In the example in FIG. 7, a display indicating a 5-point speed reduction and a display indicating a 10-point stamina increase are shown. The skill effect displays R32 are displayed in association with the skill-effect imparted game media for which the skill activation judgment unit 232 has judged that the skill activation conditions are met and that are specified by the skill-effect imparting target identification unit 233.

The ranking display area R33 displays the ranking of the respective game media on the player's team during a race along with the images I1 of the characters representing said game media. In the example in FIG. 7, the display indicates that the game medium of the character A is at the first place among 18 game media, the game medium of the character E is at the $5^{th}$ place among the 18 game media, and the game media of the character B is at the $18^{th}$ place among the 18 game media.

The situation describing area R34 is an area in which situation descriptions during a race are displayed. The situation descriptions during a race are generated by the game execution unit 23*b* on the basis of the race progress. The situation describing area R34 displays comments by a virtual commentator and live commentaries by a virtual anchor, as in a horse racing broadcasting. These comments and live commentaries are generated by the game execution unit 23*b* on the basis of the race progress.

The ranking determination unit 235 is configured by including the processor 11 and determines the respective rankings of all game media employed in the game.

Specifically, the ranking determination unit 235 determines, as a race ends, the rankings of all participating game media for each race. In the case in which 18 game media participate in each race, the rankings are determined so that one of first place to $18^{th}$ place is assigned to each of the game media in each race. For example, the ranking determination unit 235 determines the rankings in accordance with goal arrival orders in the respective races. In addition, the ranking determination unit 235 may assign the ranking of the last place to game media that dropped out of the race. For example, the ranking determination unit 235 may uniformly assign the ranking of the last place to game media of a prescribed ranking (for example, $10^{th}$ place) or lower or game media that failed to reach the goal within a prescribed time.

Figure 8:
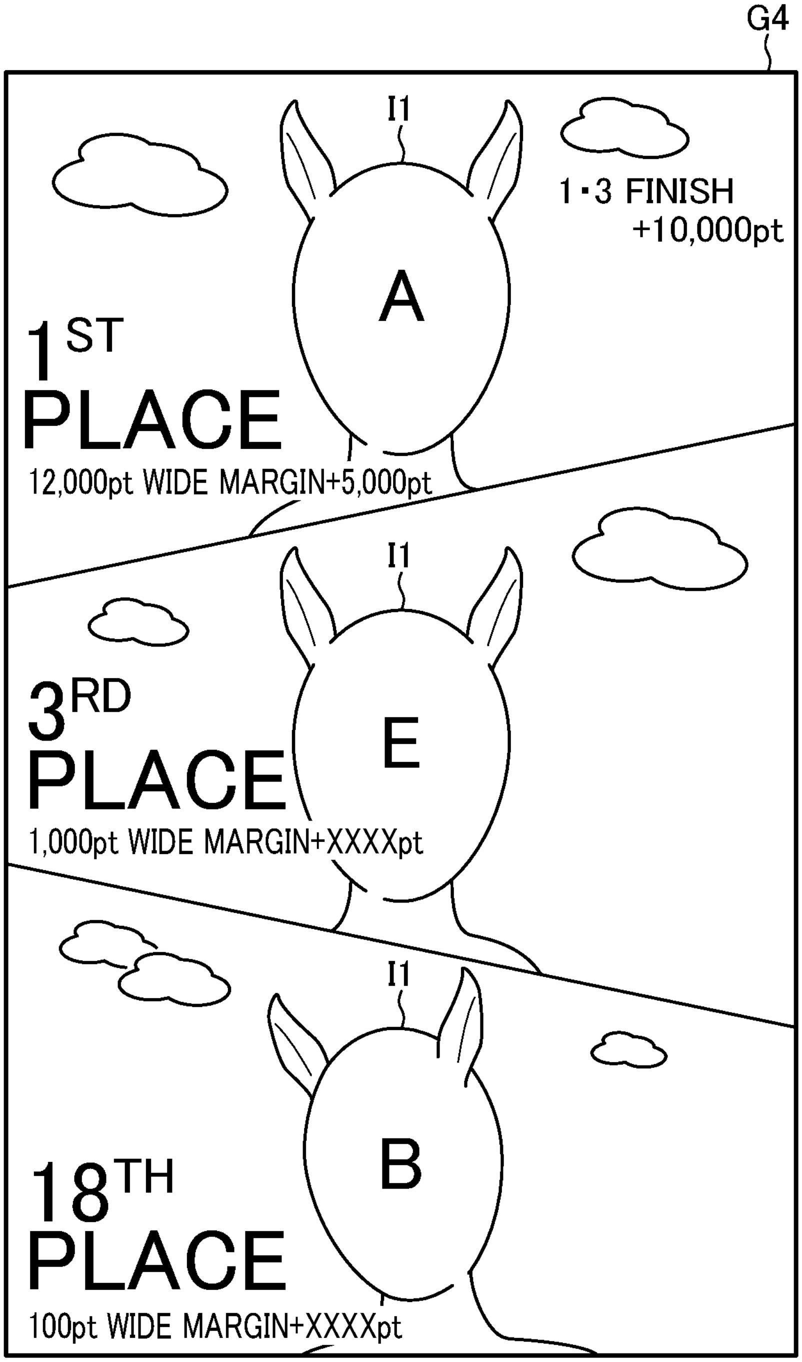
FIG. 8 is an example of a player-team race result screen.

The ranking determination unit 235 causes the display device 13 to display a player's team race result screen G4. FIG. 8 is an example of the player's team race result screen G4. The player's team race result screen G4 is a screen that shows race results of the respective game media on the player's own teams. The player's team race result screen G4 displays the images I1 of the respective game media and the race results therefor. The race results can include the rankings of the corresponding game media and earned points determined on the basis of said rankings. The earned points can include earned points granted to the respective game media and earned points granted to the player or the teams, and the earned points can be determined by the benefit granting unit 23*c* on the basis of the rankings.

The winning-team determination unit 236 is configured by including the processor 11 and determines a winning team on the basis of the rankings determined by the ranking determination unit 235. In one example, a team to which a game medium whose ranking is determined to be the first place by the ranking determination unit 235 belongs is determined to be the winning team and the rest of teams are determined to be losing teams. In another example, the ranks of the respective teams are determined on the basis of the rankings determined by the ranking determination unit 235, the team at the top rank is determined to be the winning team, and the rest of the teams are determined to be losing teams. The rank of each team is determined on the basis of, for example, the highest ranking in the team. The highest ranking in a team is the ranking that is closest to the first place in the team. For example, with a first team consisting of game media at the first place, the $5^{th}$ place, and the $18^{th}$ place and a second team consisting of game media at the third place, the $7^{th}$ place, and the $10^{th}$ place, the highest ranking in the first team is the first place and the highest ranking in the second team is the third place; therefore, the winning-team determination unit 236 determines that the rank of the first team to be first and the rank of the second team to be second and determines the first team to be the winning team.

Figure 9:
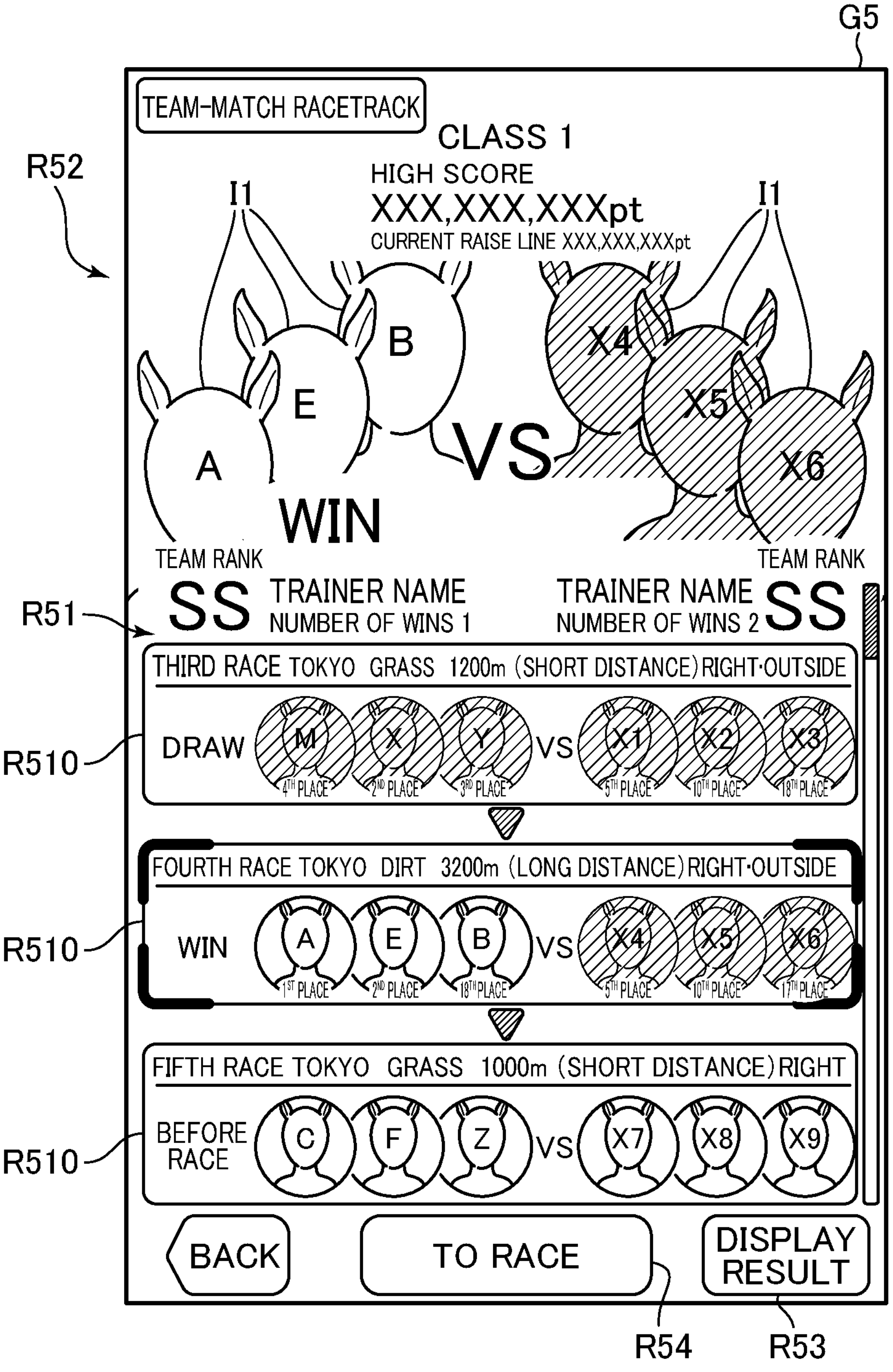
FIG. 9 is an example of a win-loss result screen.

The winning-team determination unit 236 causes the display device 13 to display a win-loss result screen G5, which displays the determined win-loss of the teams. FIG. 9 is an example of the win-loss result screen G5. In the example in FIG. 9, the display on the win-loss result screen G5 includes a race result display area R51, a team information display area R52, a result display button R53, and a race start button R54.

The race result display area R51 displays individual race result information R510. In the example in FIG. 9, five race result information R510 areas are displayed. The race result display area R51 is positioned at the lower half of the win-loss result screen G5, and, in the case in which all race result information R510 areas cannot be displayed, the remaining areas may be displayed by means of scrolling, as in the example in FIG. 9.

The display of the race result information R510 includes, for example, race information including the virtual racetrack location, the riding ground, the distance, and so forth, the images I1 and the rankings of the game media of the player's team, the images I1 and the rankings of the game media of opponent's team, and the race result for the player. The race result can be one of "WIN", "LOSE", and "DRAW". "WIN" is the result in the case in which one of the game media of the player's team has won the first place, "LOSE" is the result in the case in which one of the game media of the opponent's team has won the first place, and "DRAW" is the result in the case in which an automatically set game medium has won the first place in the case in which automatically set game media are set by the game program and means the contest between the player and the opponent has ended in draw. In the example in FIG. 9, the display indicates that the race result of the third race is "DRAW" and the race result of the fourth race is "WIN". Regarding the fifth race, "BEFORE RACE" which indicates that the race has not started yet is displayed. The images I1 of the game media of the teams ended in "LOSE" and "DRAW" may be displayed by reducing the brightness thereof as compared with the game media of the winning team.

The team information display area R52 is an area in which information about the teams that have participated in the race corresponding to the selected race result information R510 is displayed. The team information display area R52 displays information related to the player's team and the opponent's team that have participated in the race corresponding to the selected race result information R510. The information related to the teams can include the name and the rank of the player or the opponent, the images I1 of the game media constituting the teams, the race result, and the earned points of the player. In the example in FIG. 9, the race result information R510 for the fourth race is selected, and the team information display area R52 displays the information related to the teams that had participated in the fourth race. In the case in which the race result information R510 for the race that has not started yet is selected, the race result and the earned points are not displayed. In one example, the winning-team determination unit 236 can cause the information related to the teams to be displayed in the team information display area R52 as a result of receiving a signal detecting that the player has pressed one of the race result information R510 areas via the input device 12.

The result display button R53 is a button for causing the details of the race result information R510 selected by the player to be displayed. In one example, as a result of the winning-team determination unit 236 receiving a signal indicating that the result display button R53 has been pressed via the input device 12 in the state in which the race result information R510 for one of the races that have ended is selected, a race arrival order screen G6 (see FIG. 10), which shows the arrival order or the like of the race of the selected race result information R510, is displayed on the display device 13. In another example, as a result of the game execution unit 23*b* (for example, the ranking determination unit 235 or the winning-team determination unit 236) receiving the signal indicating that the result display button R53 has been pressed via the input device 12 in the state in which the race result information R510 in the before-race state, shown in FIG. 9, is selected, for example, rendering of the race screen G3 and so forth for said race is omitted or simplified, and the race arrival order screen G6 of the race is displayed on the display device 13.

The race start button R54 is a button for starting the race in the before-race state. In the example in FIG. 9, the fifth race that is in the before-race state will be started. Specifically, as a result of the game execution unit 23*b* receiving a signal indicating that the race start button R54 has been pressed in the state in which the race result information R510 for the fifth race is selected via the input device 12, said race and rendering thereof are started.

Figure 10:
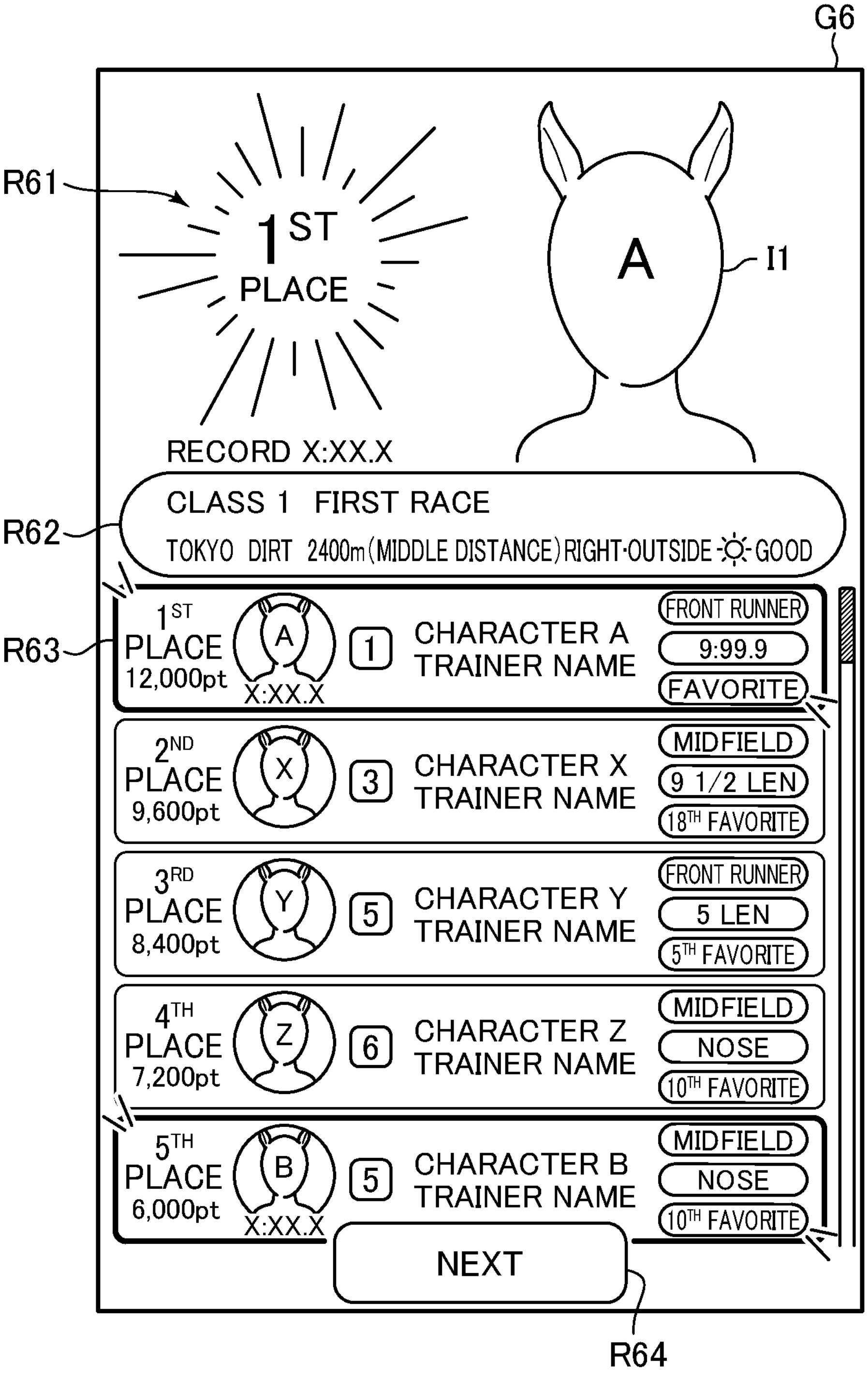
FIG. 10 is an example of a race arrival order screen.

FIG. 10 is an example of the race arrival order screen G6. The display on the race arrival order screen G6 includes a top display area R61, a race information display area R62, an arrival order display area R63, and a transition button R64.

The display in the top display area R61 includes the image I1, the ranking, and the record of the game medium that won the first place in the race. The record is the time from the start to the goal of the race for the game medium that won the first place. The race information display area R62 displays information related to the race. The information rated to the race can include, for example, the virtual racetrack location, the riding ground, the distance, and so forth.

The arrival order display area R63 displays the race rankings of the respective game media. The display may include, along with the rankings, the images I1, the names, the player's name (trainer's name), the records, the earned points, the tactics, and the before-race popularity rankings of the game media. The earned points are points earned, on the basis of the rankings, by the game media corresponding to said rankings, by the team to which said game media belong, or by the player of the game media, and can be determined by the benefit granting unit 23*c*. A ranking list for a race may be displayed in the arrival order display area R63 or a portion of the ranking list may be displayed, as in the example in FIG. 10, and the rest may be displayed by means of scrolling. The transition button R64 is a button for transitioning the screen displayed on the display device 13 to another screen from the race arrival order screen G6. In one example, the display returns to the win-loss result screen G5 in the case in which races in the before-race state are remaining and the display transitions to a player result screen G7 (see FIG. 11), described later, in the case all races have ended.

The player win-loss determination unit 237 is configured by including the processor 11 and determines, after all races have ended, the player's win-loss on the basis of the match records of the respective races against the opponent. In one example, the player win-loss determination unit 237 compares, on the basis of the results determined by the winning-team determination unit 236, the number of races the player won and the number of races the opponent won and determines that the player is the winner in the case in which the number of wins for the player is greater than the number of wins for the opponent. The player win-loss determination unit 237 determines the results to be "DRAW" in the case in which the number of wins for the player and the number of wins for the opponent are the same. The player win-loss determination unit 237 determines the player to be the looser in the case in which the number of wins for the player is less than the number of wins for the opponent. The player win-loss determination unit 237 causes the display device 13 to display the determined player's win-loss result on the player result screen G7.

The benefit granting unit 23*c* grants benefits to the game media for which the rankings thereof determined by the ranking determination unit 235 are at a prescribed ranking or higher. The benefits are rewards for the race results. Examples of the benefits include increases in the parameters associated with the game media or the player, the race record, the earned points, and a live-stage performance flag. The standard for determining whether the rankings are at or higher than the prescribed ranking for granting the benefits can be set, as appropriate, in accordance with the types of the benefits. In one example, the benefit-granting standard may be set at the third place and higher regardless of the types of the benefits or, in another example, the standard may be set for each type of the benefits and, in addition, even for the same types of benefits, standards may be set on the basis of the rankings. For example, the increases in the parameters, the race records, and the live-stage performance flag may be granted to the game media for which the rankings are at the third place or higher, and the earned points may be granted to all game media to be used in accordance with values that are set in advance for the respective rankings.

The increases in the parameters refer to adding additional amounts based on the rankings to the parameters related to the abilities and the aptitudes. The race records are, for example, the number of times a game medium has won a prescribed ranking or higher, which indicate the excellence of said game medium in races, and the player can refer to the race records in the subsequent team formation including the game medium as a member. The earned points are parameter values for employing, for example, a prescribed amount of earned points to exchange with a rare item that can be used in the game and to obtain a unique story development associated with a game medium or a new or special skill associated with a game medium. The use of the rare item obtained by the exchange can be restricted to said game medium. The rare item is, for example, a prescribed position based on a prescribed standard, such as the number of times a game medium has been used, and can be used as a title that can be compared among the players. In one example, the number of fans for a game medium may be shown as the earned points.

The live-stage performance flag is a flag for rendering a game medium so as to be at the front on a stage of a virtual live in the game. The live-stage performance flag can be granted to the respective rankings for the rankings that are at a prescribed ranking or higher. For example, the benefit granting unit 23*c* grants flags for first to third places to game media that won the first to third places in the races. In one example, the game execution unit 23*b* renders the object of the game medium to which the first place flag has been granted so as to be displayed in a large size at the center of the virtual live stage and renders the objects of the game media to which the second and third place flags have been granted so as to be displayed on either side of the object of the first-place game medium. The objects of the rest of the game media at the fourth place or lower can be rendered so as to be displayed in small sizes behind the first to third place game media, like backup dancers. The game execution unit 23*b* can render the live by executing the game program. In this way, granting the benefits to the game media could serve as one motivation for competitions among the respective game media for the arrival orders.

The benefit granting unit 23*c* may increase the benefits for a game medium to be used qualifying as an ace. For example, the benefit granting unit 23*c* can set the value obtained by multiplying the earned points based on the ranking, which are the earned points that would be granted if said game medium to be used is not an ace, by a prescribed real number (for example, 1 or 5) to be the earned points.

The benefit granting unit 23*c* grants the benefits to the teams or the player on the basis of the race results. The benefits are rewards for the race results, and are, for example, the earned points. The earned points are parameter values for employing, for example, a prescribed amount of earned points to exchange with a rare item that can be used in the game.

Figure 11:
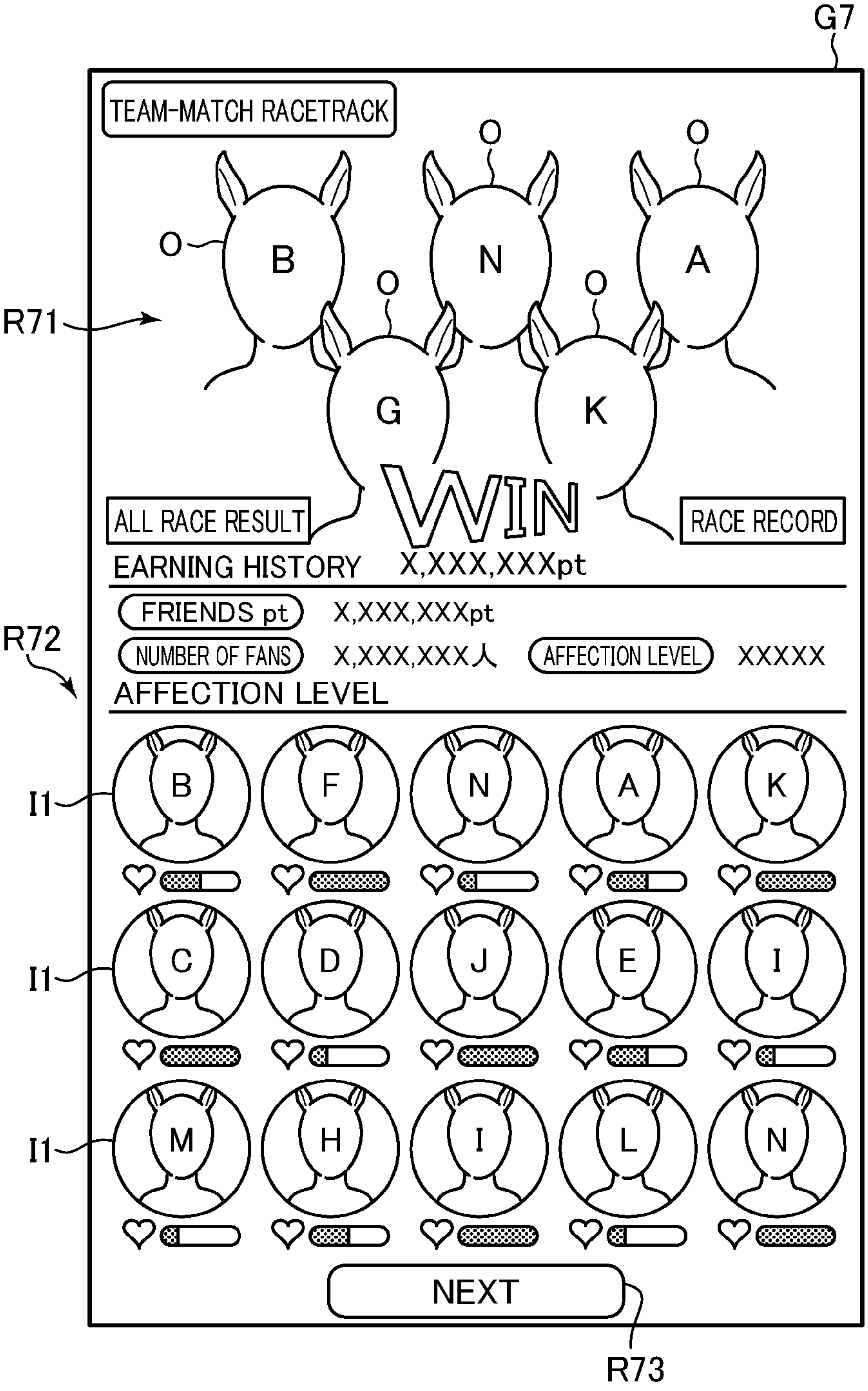
FIG. 11 is an example of a player result screen.

The benefit granting unit 23*c* causes the display device 13 to display the player result screen G7. FIG. 11 is an example of the player result screen G7. The display on the player result screen G7 includes a player result display area R71, a benefit display area R72, and a transition button R73.

The player result display area R71 displays the player's game results and the objects O of the ace game media in the respective races. The game results are overall results of the respective races and can include the player's match results against the opponent and the total earned points the player earned. The match results can be one of "WIN", "LOSE", and "DRAW" and are determined by the winning-team determination unit 236. The objects O may be still images of the characters or may be video images thereof.

The benefit display area R72 displays, for the period between starting the game or the races and ending the game or the races, the total earned points earned by the player and the total earned points earned by the respective game media. The "friend pt." in FIG. 11 is a type of the total earned points, is the sum total of the earned points earned by the player in the racing game, and can be exchanged with items that can be used in the game. The "number of fans" in FIG. 11 is a type of the earned points, is the sum total of the earned points earned by the respective game media in the racing game, and can be used in the exchange with the rare items. The "affection level" in FIG. 11 is a type of the total earned points, is the sum total of the earned points earned by the respective game media in the racing game, and can be used to unlock and render stories associated with the corresponding game media.

In addition, the benefit display area R72 may display, along with the images I1 of the game media that had participated in the respective races, meters indicating the benefits earned by the respective game media in the respective races, as shown in FIG. 11. The benefit meters visually show the earned points (affection levels) earned in the races. When the benefit meters are filled up (in other words, a prescribed amount of earned points is accumulated), stories associated with the corresponding game media can be unlocked. The stories are stored in the storage device 14, and the game execution unit 23*b* can display the rendering of the stories on the display device 13.

The transition button R73 is a button for transitioning to another screen from the player result screen G7. Another screen refers to any of a reward obtaining screen for the items or the like, a home screen, and a story unlocking screen, which are not shown. The story unlocking screen is a screen for rendering unique stories associated with a game medium in the case in which the prescribed amount of the earned points (benefit meter) is accumulated for said game medium.

[Operation]

Figure 12:
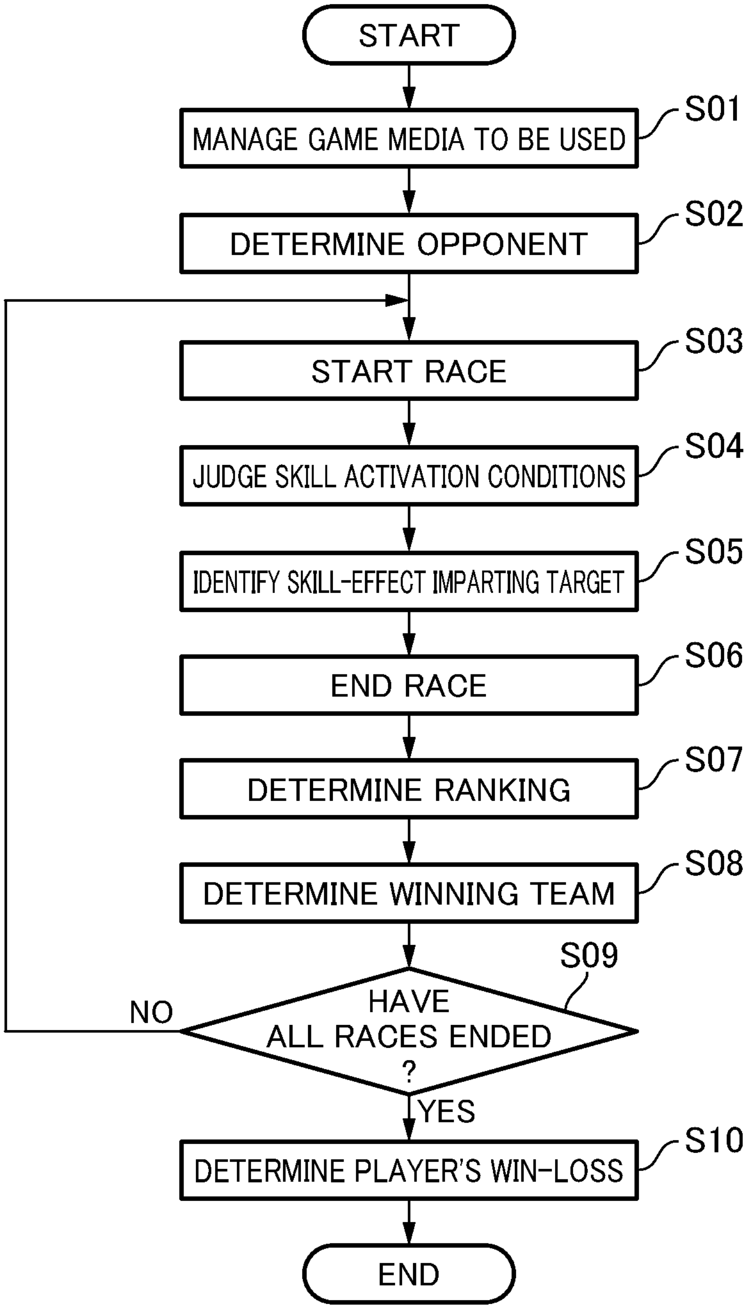
FIG. 12 is an example of an operational flowchart of the information processing device according to the embodiment of the present invention.

FIG. 12 is an example operational flowchart for the information processing device according to an embodiment of the present invention.

The information processing device 10 manages, by means of the game-media-to-be-used management unit 23*a*, the game media to be used that participate in the races (S01).

Specifically, the game-media-to-be-used management unit 23*a* causes the display device 13 to display the team formation screen G1 and the game-medium-to-be-used selection screen G2 and forms the teams that participate in the respective races. Specifically, the game-media-to-be-used management unit 23*a* causes the display device 13 to display the team formation screen G1, receives the signal detecting that the player has pressed a game-media-to-be-used setting area R11 on the team formation screen G1 via the input device 12, and causes the display device 13 to display the game-medium-to-be-used selection screen G2. Then, the game-media-to-be-used management unit 23*a* receives the selection of one of the game media displayed in the game-media-group display area R22 in the game-medium-to-be-used selection screen G2. In this way, the game-media-to-be-used management unit 23*a* receives the selections of the prescribed number of the game media for the respective teams and sets the tactics for the respective game media from the tactic setting button R12. The team formation screen G1 displays the information related to the distance of the respective races, and, because the game-medium-to-be-used selection screen G2 displays the characteristic information including the basic abilities, the distance characteristics, and the skills, the game medium suitable for the races can be selected.

The game-media-to-be-used management unit 23*a* manages the game media constituting the teams on the basis of the identifiers. In one example, upon receiving the selections of the game media of the teams, the game-media-to-be-used management unit 23*a* stores said game media of the teams in the storage device 14 in association with common identifiers. It suffices that the identifiers of the game media are the same within the teams, and the identifiers may be different or the same for the respective teams.

When the formation confirmation button R2 on the team formation screen G1 is pressed in the state in which the game media of the respective teams are selected and associated with the identifiers, the game execution unit 23*b* executes the game. Specifically, first, the game execution unit 23*b* determines the opponent by means of the opponent determination unit 231 (S02). In this embodiment, the match is between one player and one opponent. Once the opponent is determined, the game execution unit 23*b* starts a race (S03). The race unfolds and is rendered as a result of the game execution unit 23*b* executing the game program. During the race, the game execution unit 23*b* can activate the skills associated with the game media participating in the race. Specifically, the game execution unit 23*b* judges, by means of the skill activation judgment unit 232, whether the skill activation conditions for activating the skills associated with the game media participating in the race are met (S04). In the case in which the skill activation judgment unit 232 judges that the skill activation conditions are not met, said skills are not activated. In the case in which the skill activation judgment unit 232 judges that the skill activation conditions are met, the skill-effect imparting target identification unit 233 identifies, among the game media to which the skill effects could be imparted, the skill-effect imparted game media to which the skill effects will be imparted (S05).

In one example, in the case in which the skills are debuff skills, the skill-effect imparting target identification unit 233 determines, among the game media specified in the case in which the skill activation judgment unit 232 has judged that the skill activation conditions are met, only said game media in which the identifiers are different from the identifiers of the skill-activating game media as the skill-effect imparted game media, and decreases, as the debuff skill effects on the skill-effect imparted game media, the parameters of said game media. This reduction can be indicated on the race screen G3 in FIG. 7 in the form of the skill effect display R32 (for example, speed down −5 pt.). In this embodiment, the skill effect display R32 is not shown on the race screen G3 for the game media that were not specified as the skill-effect imparted game media as a result of the identification; however, the skill effect display R32 indicating said information may be displayed.

In another example, in the case in which the skills are buff skills, the skill-effect imparting target identification unit 233 determines, among the game media specified in the case in which the skill activation judgment unit 232 has judged that the skill activation conditions are met, only said game media in which the identifiers are the same as the identifiers of the skill-activating game media as the skill-effect imparted game media, and increases, as the buff skill effects on the skill-effect imparted game media, the parameters of said game media. This increase can be indicated on the race screen G3 in FIG. 7 in the form of the skill effect display R32 (for example, stamina up +10 pt.). In this embodiment, the skill effect display R32 is not shown on the race screen G3 for the game media that were not specified as the skill-effect imparted game media as a result of the identification; however, the skill effect display R32 indicating said information may be displayed.

The game execution unit 23*b* executes the game program on the basis of the parameters associated with the respective game media, and thus, changes the rankings of the game media. As shown in FIG. 7, the race screen G3 displays the provisional rankings and the situation descriptions for the game media on the player's team.

When all game media pass the goal of the racetracks, the race ends (S06). Once the race ends, the ranking determination unit 235 determines the rankings of all game media that had participated in said race (S07) and causes the display device 13 to display the player's team race result screen G4.

Next, the winning-team determination unit 236 determines, on the basis of the rankings determined by the ranking determination unit 235, the win-loss and the winning team of the race (S08), and causes the display device 13 to display the win-loss result of the race on the win-loss result screen G5. Note that, when the result display button R53 is pressed on the win-loss result screen G5 in the state in which the race result information R510 for which the race has ended is selected, the winning-team determination unit 236 can cause the display device 13 to display the race arrival order screen G6 to display the details of the race results.

After determining the rankings and the winning team, the game execution unit 23*b* judges whether all races have ended (S09). In the case in which all races have not ended ("NO" in S09), the player is promoted to press the race start button R54 or the result display button R53 on the win-loss result screen G5. When the race start button R54 or the result display button R53 is pressed in the state in which the race result information R510 in the before-race state is selected, the race is executed by repeating S03-S08. In the case in which the result display button R53 is pressed, the rendering of the race including the displays such as the race screen G3 and the player's team race result screen G4 is omitted.

On the other hand, in the case in which the game execution unit 23*b* judges that all races have ended ("YES" in S09), the player win-loss determination unit 237 determines the player's win-loss on the basis of the match records of the respective races against the opponent (S10). In one example, when all races have ended, the ranking determination unit 235 causes the display device 13 to display the race arrival order screen G6 of the final race, and the detailed results of the final race can be displayed. Then, as a result of the transition button R64 on the race arrival order screen G6 being pressed, the player win-loss determination unit 237 causes the display device 13 to display the player result screen G7 to make it possible to display the player's win-loss.

When the transition button R73 on the player result screen G7 is pressed, the game ends after rendering of the acquisition of the rare items, stories, and so forth in accordance with the amount of earned points.

[Operational Effects]

(1) The information processing device 10 according to this embodiment is an information processing device for a game in which rankings of a plurality of game media are respectively determined and a winning team is determined among a plurality of teams consisting of the game media, the device being configured so as to include the game-media-to-be-used management unit 23*a* that manages, as the same teams, a plurality of game media selected by the player from a game media group including the plurality of game media and the game execution unit 23*b* that executes the game by employing the plurality of game media managed as the teams, wherein the game execution unit 23*b* has the ranking determination unit 235 that respectively determines the rankings of the game media employed in the game and the winning-team determination unit 236 that determines the winning team on the basis of the rankings determined by the ranking determination unit 235.

Accordingly, because the game involves aspects of individual competitions as well as team competitions, both aspects need to be taken into consideration, and thus, it is possible to enhance the attractiveness of the game.

(2) The game media are associated with different identifies for the respective teams, the game execution unit 23*b* is configured so as to include: the skill activation judgment unit 232 that judges whether the skill activation conditions for activating the skills associated with the game media during the game are met; the skill-effect imparting target identification unit 233 that identifies, on the basis of the identifiers associated with the game media to which the skill effects would be imparted and the identifiers associated with the game media that activate the skills, the game media to which the skill effects will be imparted; and the parameter change unit 234 that changes the parameters associated with the identified game media.

Accordingly, because it is possible to appropriately identify the skill-effect imparting targets, it is possible to enhance the attractiveness of the game.

(3) The skills include skills that decrease the parameters associated with the game media to which the skill effects are imparted, and the skill-effect imparting target identification unit 233 is configured so as to determine, among the game media to which the skill effects would be imparted, specified in the case in which the skill activation judgment unit 232 has judged that the skill activation conditions are met, only the game media in which the identifiers are different from the identifiers of the game media that activate the skills as the game media to which the skill effects will be imparted.

Accordingly, it is possible to prevent the disadvantageous skill effects from being imparted to the game media belonging to the same team as the game media that activate the skills. Because this game determines the rankings of the respective game media, for the game medium that activates a skill, all other game media are competitors. Therefore, it is normal to impart disadvantageous skill effects to all other game media, which are competitors, and not imparting the disadvantageous effects to some of the other game media is unreasonable in an individual match in which the individual rankings are determined. However, this game has an aspect of team matches in which the win-loss is determined among teams, in addition to the aspect of individual matches. In this embodiment, by implementing the processing for not imparting the disadvantageous effects to the game media on the player's team, it is possible to prioritize winning as a team.

(4) The skills include the skills that increase the parameters associated with the game media to which the skill effects are imparted, and the skill-effect imparting target identification unit 233 is configured so as to determine, among the game media to which the skill effects would be imparted, specified in the case in which the skill activation judgment unit 232 judges that the skill activation conditions are met, only the game media in which the identifiers are the same as the identifiers of the game media that activate the skills as the game media to which the skill effects will be imparted.

Accordingly, it is possible to prevent the advantageous skill effects from being imparted to the game media belonging to the different teams from the game media that activate the skills, and it is possible to prioritize winning as a team more than individual matches. Because this game determines the rankings of the respective game media, for the game medium that activates a skill, all other game media are competitors. Therefore, it is normal to impart advantageous skill effects only to the skill-activating game medium itself, and imparting the advantageous skill effects to some of the other game media is unreasonable in an individual match in which the individual rankings are determined. However, this game has an aspect of team matches in which the win-loss is determined among teams, in addition to the aspect of individual matches. In this embodiment, by implementing the processing for also imparting the advantageous effects to the game media on the player's team, it is possible to prioritize winning as a team.

(5) The skills are configured so as to include the skills that decrease the parameters associated with the game media in the prescribed area defined on the basis of the positions of the game media that activate said skills in the game. Accordingly, it is possible to cause the game to progress in an advantageous manner for the player's team by decreasing the parameters associated with the game media on the opponent's team during the game.

(6) The skills are configured so as to include the skills that decrease the parameters associated with the game media at the prescribed rankings during the game. Accordingly, it is possible to cause the game to progress in an advantageous manner for the player's team.

(7) The information processing device 10 is configured so as to include the benefit granting unit 23*c* that imparts the benefits to the game media in which the rankings determined by the ranking determination unit 235 are at a prescribed ranking or higher. Accordingly, it is possible to increase the priority for the player to improve the rankings in the individual matches, which intensifies the competition in the individual matches, and thus, it is possible to enhance the attractiveness of the game.

[Embodiments Realized by the System]

Figure 13:
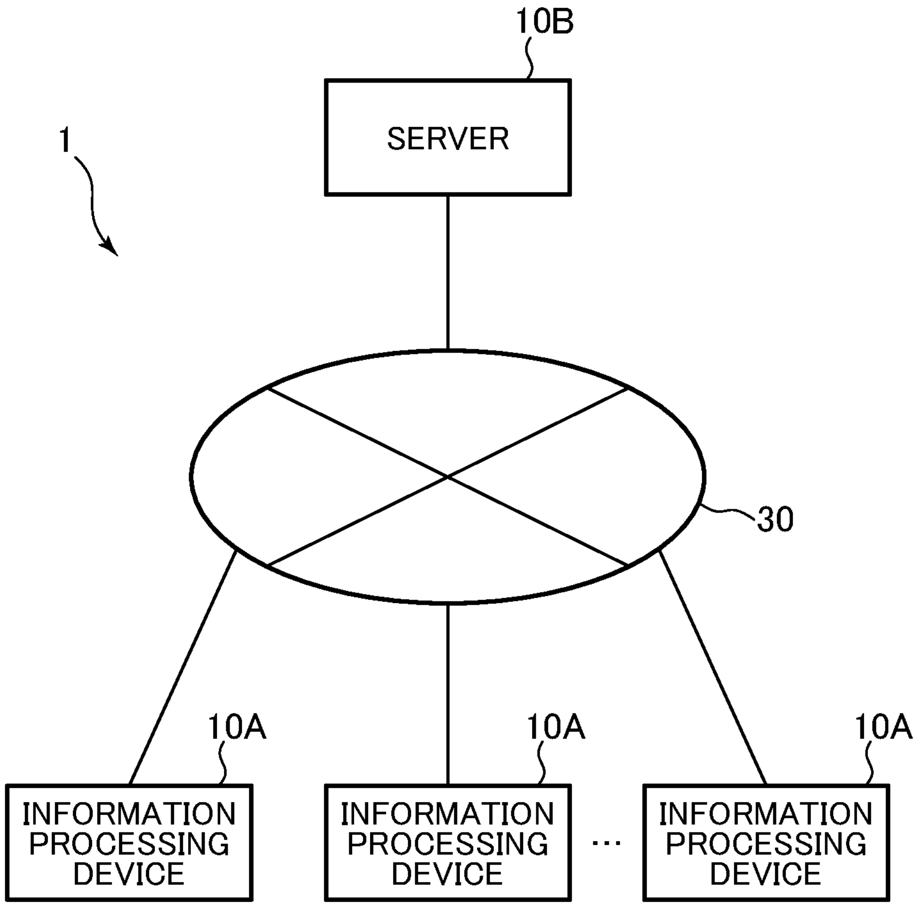
FIG. 13 is a diagram showing an example of an overall configuration of a game system according to the embodiment of the present invention.

FIG. 13 is a diagram showing an example of an overall configuration of a game system according to an embodiment of the present invention. As shown in FIG. 13, a game system 1 includes a plurality of information processing devices 10A and a server 10B. The information processing devices 10A are user terminals used by individual players and are also referred to as user terminals 10A. The user terminals 10A and the server 10B are connected with a network 30, such as Internet, so as to be able to communicate with each other. Note that the game system 1 of this embodiment will be described assuming a server-client system; however, it is possible to configure said system by means of a system that does not include the server 10B, such as a peer-to-peer network.

Each of the user terminals 10A and the server 10B have the same hardware configurations as the information processing device 10 shown in FIG. 1. In other words, an aspect of the information processing device 10 is the user terminal 10A and another aspect thereof is the server 10B. The user terminal 10A is also a smartphone in this embodiment. The server 10B is configured with one computer or a plurality of computers that provide a game that can be reproduced on the user terminals.

The server 10B stores various programs, such as a control program for controlling the progress of an online game, and various data employed in the game. The server 10B causes the game to progress by performing data transmission to/reception from the user terminals 10A on a regular basis or as needed.

In one example, the respective user terminals 10A download a game application that can be executed on said terminals 10A from the server 10B. The respective user terminals 10A receive the selections of the game media to be used that constitute the player's teams and transmit said selected data to the server 10B. The user terminals 10A and the server 10B have all or some of the functions of the game control unit 23.

Specifically, the game-media-to-be-used management unit 23*a* is configured by including the input devices 12 and the display devices 13 of the respective user terminals 10A and the processor 11 and the storage device 14 of the server 10B and stores, on the basis of the data related to the selections of the game media to be used transmitted thereto from the user terminals 10A, the data in the storage device 14 of the server 10B in association with the identifiers for the respective teams. The game execution unit 23*b* is configured by including the processor 11 of the server 10B, determines the opponents of the respective players, and executes the races. In other words, the user terminals 10A are not involved in race progressions. Specifically, the race progressions are automatically realized only by the server 10B via the execution of the game program, and is independent of manipulations on the user terminals 10A. The game execution unit 23*b* generates a game log as a result of executing the game program. The game log is information including information indicating the progress or the development of the races, which includes the positions of the game media on the racetracks at respective times in the respective races, the skill-activating times, the amounts of changes in the parameters associated with the skill activation, etc., and result information indicating the results of the respective races, and the win-loss results. The server 10B transmits the game log to the respective user terminals 10A via the server 10B and the communication devices 15 of the user terminals 10A. Each user terminal 10A plays back the game log by means of a playback unit configured by including the processor 11 and display device 13 thereof. Specifically, the playback unit uses the game log as an input to execute the game application on the user terminal 10A and causes the display device 13 of the user terminal 10A to display the rendering of the races and the results thereof.

In another example, the server 10B is a web server and provides a game service to the user terminals 10A. The respective user terminals 10A acquire HTML data for displaying a web page from the server 10B and display said web page by analyzing the acquired HTML data. In this case, the server 10B that communicates with the user terminals 10A has some of the functions of the game control unit 23. For example, the respective user terminals 10A receive the selections of the game media to be used, made by the players via the input devices 12, and the server 10B manages the game media to be used and executes the game.

Other Embodiments

In another embodiment, it is also possible to configure the present invention in the form of: a program that realizes the functions of the above-described embodiments of the present invention and the information processing thereof shown in the flowchart; or a computer-readable storage medium storing said program. In addition, in yet another embodiment, it is also possible to configure the present invention in the form of a method for realizing the functions of the above-described embodiments of the present invention and the information processing shown in the flowchart thereof. In addition, in yet another embodiment, it is also possible to configure the present invention in the form of a server that can provide, to a computer, a program that realizes the functions of the above-described embodiments of the present invention and the information processing thereof shown in the flowchart. In addition, in yet another embodiment, it is also possible to configure the present invention in the form of a virtual machine that realizes the functions of the above-described embodiments of the present invention and the information processing thereof shown in the flowchart.

In the above-described processing or operations, so long as there is no inconsistency with respect to the processing or the operations in a given step, such as utilization of data that are not yet available at the point of said step, it is possible to freely change the processing or the operations. In addition, the individual examples described above are examples for describing the present invention, and the present invention is not limited to these examples. The present invention can be implemented in various forms without departing from the scope thereof.

In the individual embodiments described above, the skill-effect imparting target identification unit 233 identifies the skill-effect imparted game media after the skill activation judgment unit 232 made the judgement on the skill activation conditions regarding whether the skills can be activated; however, the skill activation conditions judgement and the skill-effect imparting target identification may be performed in the reverse order. Specifically, the skill-effect imparting targets may be identified in the case in which there is a match with the timing of the skill activations, in other words, the activation timings defined in the skills, and, subsequently, whether the other skill activation conditions are met may be judged.

It suffices that the identifiers are associated with the players or the teams. It suffices that the identifier association is made before the skill-effect imparting target identification unit 233 performs the identification, and the identifiers may be associated with the game media before the game media to be used are selected in the game-media-to-be-used management unit 23*a* or may be associated with the game media in the stage in which the game media to be used are determined in the game-media-to-be-used management unit 23*a*.

In the individual embodiments described above, the racing game has been described as an example of the game; however, it suffices that the game is a game in which the rankings of all participating game media are determined, and the applicable scope of the present invention encompasses, for example, a game of eliminating opponents as in a battle royale.

REFERENCE SIGNS LIST

1 Game system
10 Information processing device
10A User terminal
10B Server
11 Processor
12 Input device
13 Display device
14 Storage device
15 Communication device
16 Bus
21 Input unit
22 Display unit
23 Game control unit
23*a* Game-media-to-be-used management unit
23*b* Game execution unit
231 Opponent determination unit
232 Skill activation judgment unit
233 Skill-effect imparting target identification unit
234 Parameter change unit
235 Ranking determination unit
236 Winning-team determination unit
237 Player win-loss determination unit
23*c* Benefit granting unit
30 Network
G1 Team formation screen
G2 Game-media-to-be-used selection screen
G3 Race screen
G4 Player's team race result screen
G5 Win-loss result screen
G6 Race arrival order screen
G7 Player result screen

The invention claimed is:

1. A non-transitory computer readable medium storing a program configured for causing a computer to perform a method comprising:

displaying a team formation screen on a display device, wherein the team formation screen displays a plurality of game characters that are available to form a team for executing a computer racing game;

selecting, by a first player input using a user interface and in response to displaying the team formation screen, a first game character from among a plurality of game characters;

displaying, in response to selecting the first game character, a game-medium-to-be-used selection screen on the display device, wherein the game-medium-to-be-used selection screen comprises a first display area with an image of the first game character and a second display area with characteristic information comprising a first plurality of parameters of the first game character and a first plurality of skills of the first game character;

selecting, by a second player input using the user interface and in response to displaying the game-medium-to-be-used selection screen, the first game character to join a game media group operating as the team in the computer racing game; and executing, using the user interface and a race screen that is displayed on the display device, the computer racing game by employing the team comprising the first game character, wherein executing the computer racing game comprises:

determining a respective ranking of the first game character among a plurality of rankings for a plurality of racing game characters employed in the computer racing game, and determining a winning team for the computer racing game based on the plurality of rankings.

2. The non-transitory computer readable medium according to claim 1, wherein the plurality of game characters are associated with a plurality of identifiers for a plurality of respective teams, and wherein the method further comprises:

judging whether one or more skill activation conditions for activating a second plurality of skills associated with the plurality of game characters during the computer racing game are met;

identifying the plurality of game characters to which a plurality of skill effects are imparted, based on a first portion of the plurality of identifiers to which the plurality of skill effects are imparted and a second portion of the plurality of identifiers of the plurality of game characters that activate the second plurality of skills; and changing a second plurality of parameters associated with the plurality of game characters.

3. The non-transitory computer readable medium according to claim 2, wherein the second plurality of skills include a set of skills that decrease the second plurality of parameters associated with the plurality of game characters to which the plurality of skill effects are imparted, and wherein the method further comprises:

determining, among the plurality of game characters to which the plurality of skill effects are imparted in response to judging that the one or more skill activation conditions are met, a first set of game characters among the plurality of game characters in which a first set of identifiers are different from a second set of identifiers of a second set of game characters among the plurality of game characters that activate a portion of the second plurality of skills based on imparting a portion of the plurality of skill effects.

4. The non-transitory computer readable medium according to claim 2, wherein the second plurality of skills comprise a set of skills that increase the second plurality of parameters associated with a portion of the plurality of game characters to which the plurality of skill effects are imparted, and wherein the method further comprises:

determining, among the portion of the plurality of game characters and in response to judging that the one or more skill activation conditions are met, a first set of game characters among the plurality of game characters in which a first set of identifiers are the same from a second set of identifiers of a second set of game characters among the plurality of game characters that activate a portion of the second plurality of skills based on imparting a portion of the plurality of skill effects.

5. The non-transitory computer readable medium according to claim 3, wherein the second plurality of skills include a set of skills that decrease the second plurality of parameters associated with the plurality of game characters in a prescribed area defined based on a plurality of positions of a set of game characters that activate the second plurality of skills in the computer racing game.

6. The non-transitory computer readable medium according to claim 3, wherein the second plurality of skills include a set of skills that decrease the second plurality of parameters associated with a set of game characters at prescribed rankings during the computer racing game.

7. The non-transitory computer readable medium according to claim 1, wherein the method further comprises:

imparting benefits to a set of game characters for which the plurality of rankings are at a prescribed ranking or higher.

8. An information processing device comprising:

a processor; and a memory connected to the processor, wherein the memory comprises a program configured to perform a method comprising:

displaying a team formation screen on a display device, wherein the team formation screen displays a plurality of game characters that are available to form a team for executing a computer racing game;

selecting, by a first player input using a user interface and in response to displaying the team formation screen, a first game character from among a plurality of game characters;

displaying, in response to selecting the first game character, a game-medium-to-be-used selection screen on the display device, wherein the game-medium-to-be-used selection screen comprises a first display area with an image of the first game character and a second display area with characteristic information comprising a plurality of parameters of the first game character and a plurality of skills of the first game character;

selecting, by a second player input using the user interface and in response to displaying the game-medium-to-be-used selection screen, the first game character to join a game media group operating as the team in the computer racing game; and executing, using the user interface and a race screen that is displayed on the display device, the computer racing game by employing the team comprising the first game character, wherein executing the computer racing game comprises:

determining a respective ranking of the first game character among a plurality of rankings for a plurality of racing game characters employed in the computer racing game, and determining a winning team for the computer racing game based on the plurality of rankings.

9. A method comprising:

displaying a team formation screen on a display device, wherein the team formation screen displays a plurality of game characters that are available to form a team for executing a computer racing game;

selecting, by a first player input using a user interface and in response to displaying the team formation screen, a first game character from among a plurality of game characters;

displaying, in response to selecting the first game character, a game-medium-to-be-used selection screen on the display device, wherein the game-medium-to-be-used selection screen comprises a first display area with an image of the first game character and a second display area with characteristic information comprising a plurality of parameters of the first game character and a plurality of skills of the first game character;

selecting, by a second player input using the user interface and in response to displaying the game-medium-to-be-used selection screen, the first game character to join a game media group operating as the team in the computer racing game; and executing, using the user interface and a race screen that is displayed on the display device, the computer racing game by employing the team comprising the first game character, wherein executing the computer racing game comprises:

determining a respective ranking of the first game character among a plurality of rankings for a plurality of racing game characters employed in the computer racing game, and determining a winning team for the computer racing game based on the plurality of rankings.

10. A system comprising:

a user device; and a server connected to the user device over a network, wherein the user device is configured to perform a first method comprising:

displaying a team formation screen on a display device, wherein the team formation screen displays a plurality of game characters that are available to form a team for executing a computer racing game;

selecting, by a first player input using a user interface and in response to displaying the team formation screen, a first game character from among a plurality of game characters;

displaying, in response to selecting the first game character, a game-medium-to-be-used selection screen on the display device, wherein the game-medium-to-be-used selection screen comprises a first display area with an image of the first game character and a second display area with characteristic information comprising a plurality of parameters of the first game character and a plurality of skills of the first game character; and selecting, by a second player input using the user interface and in response to displaying the game-medium-to-be-used selection screen, the first game character to join a game media group operating as the team in the computer racing game; and wherein the server is configured to perform a second method comprising:

executing, using the user interface and a race screen that is displayed on the display device, the computer racing game by employing the team comprising the first game character, wherein executing the computer racing game comprises:

determining a respective ranking of the first game character among a plurality of rankings for a plurality of racing game characters employed in the computer racing game, and determining a winning team for the computer racing game based on the plurality of rankings.

* * * * *